US012614567B2

(12) United States Patent
Huang

(10) Patent No.: US 12,614,567 B2
(45) Date of Patent: *Apr. 28, 2026

(54) SPHERICAL VIDEO EDITING

(71) Applicant: Snap Inc., Santa Monica, CA (US)

(72) Inventor: Justin Huang, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/831,986

(22) Filed: Jun. 3, 2022

(65) Prior Publication Data

US 2022/0301593 A1 Sep. 22, 2022

Related U.S. Application Data

(63) Continuation of application No. 17/319,425, filed on May 13, 2021, now Pat. No. 11,380,362, which is a
(Continued)

(51) Int. Cl.
*G11B 27/031* (2006.01)
*G06F 3/01* (2006.01)
(Continued)

(52) U.S. Cl.
CPC ............ *G11B 27/031* (2013.01); *G06F 3/017* (2013.01); *G06F 3/0346* (2013.01); *G06T 3/16* (2024.01);
(Continued)

(58) Field of Classification Search
CPC ......... G11B 27/031; G06T 7/292; G06T 7/73; G06T 3/0087; G06T 3/4038;
(Continued)

(56) References Cited

U.S. PATENT DOCUMENTS 5,754,939 A 5/1998 Herz et al.
6,038,295 A 3/2000 Mattes
(Continued)

FOREIGN PATENT DOCUMENTS

CA 2887596 A1 7/2015
CN 101082926 12/2007
(Continued)

OTHER PUBLICATIONS

"U.S. Appl. No. 15/844,089, Notice of Allowance mailed Oct. 11, 2018", 8 pgs.
(Continued)

*Primary Examiner* — Sunghyoun Park
(74) *Attorney, Agent, or Firm* — SCHWEGMAN LUNDBERG & WOESSNER, P.A.

(57) ABSTRACT

Systems and methods provide for editing of spherical video data. In one example, a computing device can receive a spherical video (or a video associated with an angular field of view greater than an angular field of view associated with a display screen of the computing device), such as by a built-in spherical video capturing system or acquiring the video data from another device. The computing device can display the spherical video data. While the spherical video data is displayed, the computing device can track the movement of an object (e.g., the computing device, a user, a real or virtual object represented in the spherical video data, etc.) to change the position of the viewport into the spherical video. The computing device can generate a new video from the new positions of the viewport.

20 Claims, 15 Drawing Sheets

Related U.S. Application Data continuation of application No. 16/798,028, filed on Feb. 21, 2020, now Pat. No. 11,037,601, which is a continuation of application No. 16/250,955, filed on Jan. 17, 2019, now Pat. No. 10,614,855, which is a continuation of application No. 15/844,089, filed on Dec. 15, 2017, now Pat. No. 10,217,488.

(51) Int. Cl.

| | |
|---|---|
| G06F 3/0346 | (2013.01) |
| G06T 3/16 | (2024.01) |
| G06T 3/4038 | (2024.01) |
| G06T 7/292 | (2017.01) |
| G06T 7/73 | (2017.01) |
| H04N 5/262 | (2006.01) |
| H04N 5/265 | (2006.01) |
| H04N 5/77 | (2006.01) |
| H04N 5/92 | (2006.01) |
| H04N 9/804 | (2006.01) |
| H04N 9/82 | (2006.01) |
| H04N 23/60 | (2023.01) |
| H04N 23/698 | (2023.01) |
| H04N 23/90 | (2023.01) |

(52) U.S. Cl.
CPC ............ *G06T 3/4038* (2013.01); *G06T 7/292* (2017.01); *G06T 7/73* (2017.01); *H04N 5/2628* (2013.01); *H04N 5/265* (2013.01); *H04N 5/772* (2013.01); *H04N 5/9201* (2013.01); *H04N 9/8042* (2013.01); *H04N 9/8205* (2013.01); *H04N 23/60* (2023.01); *H04N 23/698* (2023.01); *H04N 23/90* (2023.01); *G06T 2207/10016* (2013.01); *G06T 2210/22* (2013.01)

(58) Field of Classification Search
CPC ...... G06T 2207/10016; G06T 2210/22; H04N 23/90; H04N 23/698; H04N 23/60; H04N 5/2628; H04N 5/265; H04N 5/772; H04N 5/9201; H04N 9/8042; H04N 9/8205; G06F 3/017; G06F 3/0346
See application file for complete search history.

(56) References Cited

U.S. PATENT DOCUMENTS

| | | | |
|---|---|---|---|
| 6,158,044 | A | 12/2000 | Tibbetts |
| 6,167,435 | A | 12/2000 | Druckenmiller et al. |
| 6,205,432 | B1 | 3/2001 | Gabbard et al. |
| 6,310,694 | B1 | 10/2001 | Okimoto et al. |
| 6,484,196 | B1 | 11/2002 | Maurille |
| 6,487,586 | B2 | 11/2002 | Ogilvie et al. |
| 6,665,531 | B1 | 12/2003 | Soderbacka et al. |
| 6,701,347 | B1 | 3/2004 | Ogilvie |
| 6,711,608 | B1 | 3/2004 | Ogilvie |
| 6,757,713 | B1 | 6/2004 | Ogilvie et al. |
| 6,980,909 | B2 | 12/2005 | Root et al. |
| 7,124,164 | B1 | 10/2006 | Chemtob |
| 7,149,893 | B1 | 12/2006 | Leonard et al. |
| 7,173,651 | B1 | 2/2007 | Knowles |
| 7,243,163 | B1 | 7/2007 | Friend et al. |
| 7,278,168 | B1 | 10/2007 | Chaudhury et al. |
| 7,356,564 | B2 | 4/2008 | Hartselle et al. |
| 7,376,715 | B2 | 5/2008 | Cunningham et al. |
| 7,411,493 | B2 | 8/2008 | Smith |
| 7,478,402 | B2 | 1/2009 | Christensen et al. |
| 7,496,347 | B2 | 2/2009 | Puranik |
| 7,519,670 | B2 | 4/2009 | Hagale et al. |
| 7,535,890 | B2 | 5/2009 | Rojas |
| 7,607,096 | B2 | 10/2009 | Oreizy et al. |
| 7,703,140 | B2 | 4/2010 | Nath et al. |
| 7,912,896 | B2 | 3/2011 | Wolovitz et al. |
| 7,971,156 | B2 | 6/2011 | Albertson et al. |
| 7,996,793 | B2 | 8/2011 | Latta et al. |
| 8,131,597 | B2 | 3/2012 | Hudetz |
| 8,170,957 | B2 | 5/2012 | Richard |
| 8,199,747 | B2 | 6/2012 | Rojas et al. |
| 8,214,443 | B2 | 7/2012 | Hamburg |
| 8,238,947 | B2 | 8/2012 | Lottin et al. |
| 8,244,593 | B2 | 8/2012 | Klinger et al. |
| 8,312,097 | B1 | 11/2012 | Siegel et al. |
| 8,332,475 | B2 | 12/2012 | Rosen et al. |
| 8,487,938 | B2 | 7/2013 | Latta et al. |
| 8,570,907 | B2 | 10/2013 | Garcia, Jr. et al. |
| 8,718,333 | B2 | 5/2014 | Wolf et al. |
| 8,724,622 | B2 | 5/2014 | Rojas |
| 8,745,132 | B2 | 6/2014 | Obradovich |
| 8,856,691 | B2 | 10/2014 | Geisner et al. |
| 8,874,677 | B2 | 10/2014 | Rosen et al. |
| 8,909,679 | B2 | 12/2014 | Root et al. |
| 8,909,714 | B2 | 12/2014 | Agarwal et al. |
| 8,909,725 | B1 | 12/2014 | Sehn |
| 8,914,752 | B1 | 12/2014 | Spiegel |
| 8,995,433 | B2 | 3/2015 | Rojas |
| 9,040,574 | B2 | 5/2015 | Wang et al. |
| 9,055,416 | B2 | 6/2015 | Rosen et al. |
| 9,083,770 | B1 | 7/2015 | Drose et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,113,301 | B1 | 8/2015 | Spiegel et al. |
| 9,148,424 | B1 | 9/2015 | Yang |
| 9,191,776 | B2 | 11/2015 | Root et al. |
| 9,204,252 | B2 | 12/2015 | Root |
| 9,225,805 | B2 | 12/2015 | Kujawa et al. |
| 9,225,897 | B1 | 12/2015 | Sehn et al. |
| 9,230,160 | B1 | 1/2016 | Kanter |
| 9,237,202 | B1 | 1/2016 | Sehn |
| 9,264,463 | B2 | 2/2016 | Rubinstein et al. |
| 9,276,886 | B1 | 3/2016 | Samaranayake |
| 9,294,425 | B1 | 3/2016 | Son |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,430,783 | B1 | 8/2016 | Sehn |
| 9,443,227 | B2 | 9/2016 | Evans et al. |
| 9,482,882 | B1 | 11/2016 | Hanover et al. |
| 9,482,883 | B1 | 11/2016 | Meisenholder |
| 9,489,661 | B2 | 11/2016 | Evans et al. |
| 9,491,134 | B2 | 11/2016 | Rosen et al. |
| 9,532,171 | B2 | 12/2016 | Allen et al. |
| 9,537,811 | B2 | 1/2017 | Allen et al. |
| 9,560,006 | B2 | 1/2017 | Prado et al. |
| 9,628,950 | B1 | 4/2017 | Noeth et al. |
| 9,652,896 | B1 | 5/2017 | Jurgenson et al. |
| 9,659,244 | B2 | 5/2017 | Anderton et al. |
| 9,693,191 | B2 | 6/2017 | Sehn |
| 9,705,831 | B2 | 7/2017 | Spiegel |
| 9,742,713 | B2 | 8/2017 | Spiegel et al. |
| 9,785,796 | B1 | 10/2017 | Murphy et al. |
| 9,825,898 | B2 | 11/2017 | Sehn |
| 9,854,219 | B2 | 12/2017 | Sehn |
| 9,961,520 | B2 | 5/2018 | Brooks et al. |
| 10,102,423 | B2 | 10/2018 | Shaburov et al. |
| 10,127,714 | B1 | 11/2018 | Kvaalen et al. |
| 10,217,488 | B1 | 2/2019 | Huang |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,687,039 | B1 | 6/2020 | Vaden et al. |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |

(56) References Cited

U.S. PATENT DOCUMENTS

| | | |
|---|---|---|
| 11,030,454 B1 | 6/2021 | Xiong et al. |
| 11,036,368 B1 | 6/2021 | Al Majid et al. |
| 11,037,601 B2 | 6/2021 | Huang |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,380,362 B2 | 7/2022 | Huang |
| 11,531,402 B1 | 12/2022 | Stolzenberg |
| 11,546,505 B2 | 1/2023 | Canberk |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0012788 A1 | 1/2009 | Gilbert et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0301934 A1 | 12/2011 | Tardif |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0201328 A1 | 8/2013 | Chung |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0171036 A1 | 6/2014 | Simmons |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0340427 A1 | 11/2014 | Baker |
| 2014/0359024 A1 | 12/2014 | Spiegel |
| 2014/0359032 A1 | 12/2014 | Spiegel et al. |
| 2015/0120293 A1 | 4/2015 | Wohlert et al. |
| 2015/0199082 A1 | 7/2015 | Scholler et al. |
| 2015/0227602 A1 | 8/2015 | Ramu et al. |
| 2015/0256808 A1* | 9/2015 | MacMillan ............ G06V 20/40 |
| | | 348/43 |
| 2015/0370320 A1 | 12/2015 | Connor |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0253087 A1* | 9/2016 | Moon ................. G06F 3/04883 |
| | | 715/720 |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0098312 A1 | 4/2017 | Souchard |
| 2017/0123487 A1 | 5/2017 | Hazra et al. |
| 2017/0161382 A1 | 6/2017 | Ouimet et al. |
| 2017/0263029 A1 | 9/2017 | Yan et al. |
| 2017/0277684 A1 | 9/2017 | Dharmarajan Mary |
| 2017/0277685 A1 | 9/2017 | Takumi |
| 2017/0287006 A1 | 10/2017 | Azmoodeh et al. |
| 2017/0295250 A1 | 10/2017 | Samaranayake et al. |
| 2017/0302714 A1 | 10/2017 | Ramsay et al. |
| 2017/0345205 A1 | 11/2017 | Lai et al. |
| 2017/0347026 A1 | 11/2017 | Hannuksela |
| 2017/0351910 A1 | 12/2017 | Elwazer et al. |
| 2017/0374003 A1 | 12/2017 | Allen et al. |
| 2017/0374508 A1 | 12/2017 | Davis et al. |
| 2018/0103197 A1 | 4/2018 | Campbell et al. |
| 2018/0130264 A1* | 5/2018 | Ebacher ................. G06T 19/20 |
| 2018/0158370 A1 | 6/2018 | Pryor |
| 2018/0160123 A1* | 6/2018 | Van Der Auwera ........................ |
| | | H04N 19/167 |
| 2018/0234669 A1* | 8/2018 | Chen .................... H04N 13/373 |
| 2019/0158800 A1* | 5/2019 | Kokare ................. G06V 20/49 |
| 2019/0189160 A1 | 6/2019 | Huang |
| 2020/0194033 A1 | 6/2020 | Huang |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0264949 A1 | 8/2021 | Huang |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |

FOREIGN PATENT DOCUMENTS

| | | |
|---|---|---|
| CN | 203405772 U | 1/2014 |
| CN | 103049761 | 8/2016 |
| CN | 106095235 A | 11/2016 |
| CN | 107124589 A | 9/2017 |
| CN | 107318008 | 11/2017 |
| CN | 107396077 | 11/2017 |
| CN | 110495166 A | 11/2019 |
| CN | 110495166 B | 11/2020 |
| CN | 112256127 A | 1/2021 |
| CN | 112256127 | 5/2024 |
| EP | 1087618 | 3/2001 |
| EP | 3707693 | 9/2020 |
| JP | 6093473 B1 | 2/2017 |
| KR | 20110023468 A | 3/2011 |
| KR | 102100744 B1 | 5/2020 |
| KR | 102332950 B1 | 12/2021 |
| KR | 102469263 | 11/2022 |
| KR | 20220158824 | 12/2022 |
| WO | WO-2012000107 A1 | 1/2012 |
| WO | WO-2013008251 A2 | 1/2013 |
| WO | WO-2014194262 A2 | 12/2014 |

(56)                References Cited

FOREIGN PATENT DOCUMENTS

| WO | WO-2015192026 A1 | 12/2015 |
|----|------------------|---------|
| WO | WO-2016054562 A1 | 4/2016 |
| WO | WO-2016065131 A1 | 4/2016 |
| WO | WO-2016/112299 A1 | 7/2016 |
| WO | 2016168591 | 10/2016 |
| WO | WO-2016179166 A1 | 11/2016 |
| WO | WO-2016179235 A1 | 11/2016 |
| WO | WO-2017037962 A1 | 3/2017 |
| WO | WO-2017116952 A1 | 7/2017 |
| WO | WO-2017142353 A1 | 8/2017 |
| WO | WO-2017176739 A1 | 10/2017 |
| WO | WO-2017176992 A1 | 10/2017 |
| WO | WO-2017205794 A1 | 11/2017 |
| WO | WO-2018005644 A1 | 1/2018 |
| WO | 2019094618 | 5/2019 |
| WO | WO-2019118877 A1 | 6/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

"U.S. Appl. No. 16/250,955, Non Final Office Action mailed Sep. 5, 2019", 9 pgs.

"U.S. Appl. No. 16/250,955, Notice of Allowance mailed Dec. 3, 2019", 5 pgs.

"U.S. Appl. No. 16/250,955, Response filed Nov. 21, 2019 to Non Final Office Action mailed Sep. 5, 2019", 8 pgs.

"U.S. Appl. No. 16/798,028, Corrected Notice of Allowability mailed May 20, 2021", 2 pgs.

"U.S. Appl. No. 16/798,028, Notice of Allowance mailed Feb. 18, 2021", 8 pgs.

"U.S. Appl. No. 17/319,425, Corrected Notice of Allowability mailed Apr. 11, 2022", 2 pgs.

"U.S. Appl. No. 17/319,425, Non Final Office Action mailed Nov. 26, 2021", 9 pgs.

"U.S. Appl. No. 17/319,425, Notice of Allowance mailed Mar. 3, 2022", 5 pgs.

"U.S. Appl. No. 17/319,425, Response filed Feb. 7, 2022 to Non Final Office Action mailed Nov. 26, 2021", 8 pgs.

"Chinese Application Serial No. 201880023571.3, Office Action mailed Mar. 20, 2020", w/ English Translation, 17 pgs.

"Chinese Application Serial No. 201880023571.3, Office Action mailed Jun. 18, 2020", w/ English Translation, 7 pgs.

"Chinese Application Serial No. 201880023571.3, Response Filed Jun. 8, 2020 to Office Action mailed Mar. 20, 2020", w/ English Machine Translation, 7 pgs.

"Chinese Application Serial No. 201880023571.3, Response filed Jul. 28, 2020 to Office Action mailed Jun. 18, 2020", w/ English Machine Translation, 7 pgs.

"International Application Serial No. PCT/US2018/065750, International Preliminary Report on Patentability mailed Jun. 25, 2020", 6 pgs.

"International Application Serial No. PCT/US2018/065750, International Search Report mailed Apr. 17, 2019", 3 pgs.

"International Application Serial No. PCT/US2018/065750, Written Opinion mailed Apr. 17, 2019", 4 pgs.

"Korean Application Serial No. 10-2020-7009804, Notice of Preliminary Rejection mailed Feb. 19, 2021", w/ English Translation, 14 pgs.

"Korean Application Serial No. 10-2020-7009804, Response filed Apr. 19, 2021 to Notice of Preliminary Rejection mailed Feb. 19, 2021", w/ English Claims, 18 pgs.

"Korean Application Serial No. 10-2021-7038607, Notice of Preliminary Rejection mailed Feb. 10, 2022", W/English Translation, 9 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL:http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL:.http://www.eweek.com/print/c/a/MessagingandCollaboration/StealthTextShouldYouChoosetoAcceptIt>, (Dec. 13, 2005), 2 pgs.

"Chinese Application Serial No. 202011131842.2, Office Action mailed Jul. 29, 2023", w/ English Translation, 2 pgs.

U.S. Appl. No. 15/844,089 U.S. Pat. No. 10,217,488, filed Dec. 15, 2017, Spherical Video Editing.

U.S. Appl. No. 16/250,955 U.S. Pat. No. 10,614,855, filed Jan. 17, 2019, Spherical Video Editing.

U.S. Appl. No. 16/798,028 U.S. Pat. No. 11,037,601, filed Feb. 21, 2020, Spherical Video Editing.

U.S. Appl. No. 17/319,425, filed May 13, 2021, Spherical Video Editing.

* cited by examiner

SPHERICAL VIDEO EDITING

PRIORITY

This application is a continuation of and claims the benefit of priority of U.S. patent application Ser. No. 17/319,425, filed May 13, 2021, which is a continuation of and claims the benefit of priority of U.S. patent application Ser. No. 16/798, 028, filed Feb. 21, 2020, which is a continuation of and claims the benefit of priority of U.S. patent application Ser. No. 16/250,955, filed Jan. 17, 2019, which is a continuation of and claims the benefit of priority of U.S. patent application Ser. No. 15/844,089, filed on Dec. 15, 2017, which are hereby incorporated by reference herein in their entirety.

TECHNICAL FIELD

The present disclosure generally relates to the field of video editing, and more particularly to spherical video editing.

BACKGROUND

Spherical video (sometimes referred to as virtual reality (VR) video, immersive video, 180- or 360-degree video, etc.) is becoming an increasingly popular way for users to enjoy digital. These videos allow users to pan left and right, zoom in and out, and rotate from a current perspective to a new perspective to simulate immersion in a virtual environment represented by the video data. Spherical videos are typically made using multiple cameras capturing different perspectives of a scene, and presented within head-mounted displays (HMDs) and other computing devices (e.g., desktops, laptops, tablets, smart phones, etc.).

BRIEF DESCRIPTION OF THE DRAWINGS

The present disclosure will describe various embodiments with reference to the drawings, in which:

FIG. 4A-4G illustrate an example of an approach for editing spherical video data in accordance with an embodiment;

DETAILED DESCRIPTION

Figure 1:
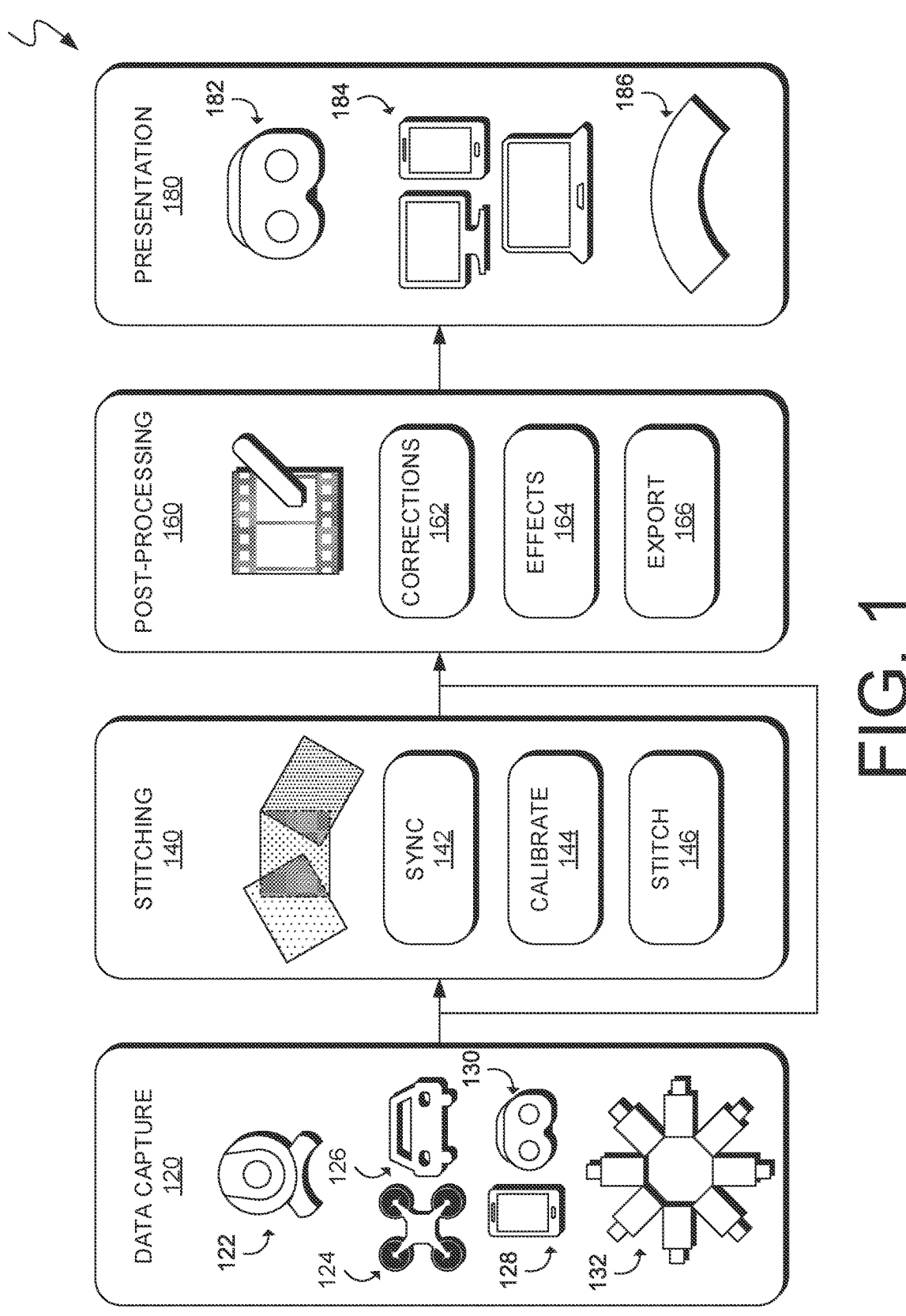
FIG. 1 illustrates an example of a work flow for creating spherical video data in accordance with an embodiment.

Although spherical video is becoming an increasingly popular medium for users to share more of their experiences, not all computing devices capable of playing video, however, may be able to display a spherical video (or display it in the manner intended by the spherical video producer) because presenting a spherical video often requires a much greater amount of computing resources compared to conventional video. In some cases, playing spherical videos can provide a poor user experience because of processing (CPU and/or graphical) and network latency. Users may especially be reluctant to play and to share a spherical video on mobile computing devices because of these device's generally limited computing resources (e.g., with respect to desktops, laptops, and the like). Another potential drawback of spherical videos is the inclination of video producers to be less diligent about directly tracking an object of interest using a spherical video camera (sometimes referred to as omnidirectional camera, 360 degree camera, VR camera, etc.), rig, or other spherical video capturing system because the increased angular field of view of the spherical video capturing system is more forgiving in this regard than conventional video cameras. Further, producers assume they can edit spherical videos in post-processing but editing via conventional spherical video editing tools often require a great amount of time and effort. This factor can also deter users interested in making casual video edits or on occasions users may only want to share spherical video content ephemerally.

Systems and methods in accordance with various embodiments of the present disclosure may overcome one or more of the aforementioned and other deficiencies experienced in conventional approaches for editing spherical video data. In an embodiment, a computing device may receive spherical video data or video data associated with an angular field of view (e.g., 120°, 180°, 270°, 360°, etc.) greater than an angular field of view of a display screen of the computing device. For example, the computing device may be capable of capturing a plurality of videos of the same scene from multiple viewpoints or the computing device may receive the spherical video data from another computing device, such as by downloading the video data over the Internet or transferring the video data from a spherical video capturing system.

As the computing device plays the spherical video data, the computing device may receive an input associated with editing or recording the spherical video based on input movement data. For example, the computing device may include a client application for a content sharing network that includes a virtual button that a user may press down upon to initiate editing/recording and maintain contact with to continue editing/recording. As another example, the computing device may receive a first gesture (e.g., actuation of a physical or virtual button, voice command, hand gesture, eye gesture, head gesture, etc.) for initiating editing/recording and a second gesture for pausing or stopping editing/recording.

The computing device can track the movement of an object to change the position of the viewport into the spherical video data. The computing device may center the frames of the edited video using the changes in position. The tracked object can include the computing device itself, a portion of a user of the computing (e.g., eyes, head, etc.), or other object to which the computing device is mounted (e.g., drone, vehicle, etc.). The computing device may use motion and position sensors, cameras, other sensors or devices, or a combination of these components for tracking a moving object. In some embodiments, the tracked object can also include an object (real or virtual) represented in the spherical video data.

The computing device can generate the edited video using the new positions of the viewport and a least a portion of the pixels of the spherical video data corresponding to those positions. The new positions can be mapped to centroids of the regions of the spherical video data displayed on playback of the edited video; rotation, translation, and/or transformation information for updating the spherical video data; a surface or volume to extract from the original spherical video data. In some embodiments, the frames of the edited video may be limited to what is displayable on a display screen of the computing device. In other embodiments, the frames of the edited video may include cropped frames of the spherical video data associated with an angular field of view (e.g., horizontal, vertical, diagonal, etc.) greater than the angular field of view of the display screen but less than 360° along at least one dimension (e.g., 120°, 180°, etc.). In still other embodiments, the computing device or a content server may determine the format of the edited video depending on availability of computing resources (e.g., processing, memory, storage, network bandwidth, power, etc.) of recipient computing devices. In some embodiments, the computing device or content server may additionally or alternatively use other strategies for the reducing the size of the edited video for distribution, such as by modifying the video resolution of the edited video (e.g., uniform video resolution, or regions of varying video resolutions), the rate of the frames per second (fps) of the edited video, etc.

FIG. 1 shows an example of work flow 100 for creating spherical video data. For any method, process, or flow discussed herein, there can be additional, fewer, or alternative steps performed or stages that occur in similar or alternative orders, or in parallel, within the scope of various embodiments unless otherwise stated. Work flow 100 includes four primary stages, data capture stage 120 (e.g., audio data, video data, still image data, etc.), stitching stage 140, post-processing stage 160, and presentation stage 180. In data capture stage 120, spherical video producers may use multiple cameras positioned at known offsets from one another and/or including lenses having different focal lengths or angular fields of view (e.g., fisheye, wide angle, etc.) to concurrently capture video data of multiple perspectives of the same scene. The multiple cameras may be part of a single device, such as 360-degree digital camera 122 (e.g., SAMSUNG GEAR® 360, RICOH® THETA, 360FLY®, etc.), 360-degree camera drone 124 (e.g., DRONEVOLT® Janus VR 360, QUEEN B ROBOTICS EXO360 DRONE™, 360 DESIGNS FLYING EYE™, etc.), smart vehicle 126 (e.g., TESLA®, WAYMO®, UBER®, etc.), smart phone 128 (e.g., APPLE IPHONE®, SAMSUNG GALAXY®, HUAWEI MATE®, etc.), wearable device 130 (e.g., head-mounted device, smart glasses, earphones, etc.), or other devices. Separate and distinct cameras can also be coupled using mount or rig 132 (e.g., FREEDOM360™, 360RIZE®, VARAVON™, etc.). The mounts or rigs can be hand-held or coupled to dollies, drones, vehicles, users' heads or other body parts, and other objects.

The multiple cameras of a spherical video capturing system can have varying angular fields of view. A single camera's angular field of view α depends on the focal length f of the lens and the size of the camera's sensor d:

$$\alpha = 2\,\tan^{-1}\frac{d}{2f} \qquad \text{(Equation 1)}$$

The angular field of view can be measured horizontally, vertically, or diagonally but will be referred to herein as both the horizontal and the vertical angular field of view herein unless specified otherwise. A fisheye lens can have an angular field of view that is approximately 180° or greater, a wide-angle lens can have an angular field of view approximately between 60° and 120° (although some wide-angle lenses may have angular fields of view greater than 120°), a standard lens can have an angular field of view approximately between 30° and 60°, and a long focus lens can have an angular field of view of approximately 35° or less. An example of a configuration for a spherical video capturing system may include a pair of cameras with fisheye lenses with a first camera facing the front and a second camera facing the back. The fisheye lenses may have angular fields of view greater than 180° (e.g., 210°) so there is overlap in the image data captured by cameras for improved output during stitching stage 140. Another example is a system that includes six cameras having wide angle or standard lenses configured in the shape of a cube. Other spherical video capturing systems may include fewer or a greater number of cameras and/or may be arranged in different configurations.

In stitching stage 140, the video data from each camera is stitched together to create a single video associated with an angular field of view that may be greater than that of a single camera of the spherical video capturing system. Some spherical video cameras have stitching functionality built-into the cameras. Other users may prefer stitching spherical videos from raw video data or may lack a system with this built-in functionality. In these cases, these users will run stitching software to combine the footage from each camera into spherical video data. Examples of such software include Autopano® Video from Kolor® (a subsidiary of GoPro®); VIDEOSTITCH® from ORAH® (formerly VIDEO-STITCH®); and StereoStitch from STEREOSTITCH™ (a subsidiary of DERMANDAR™ S.A.L. of Jounieh, Lebanon), among others. The video stitching software often require the footage from each camera to be in the same format (e.g., MP4 or MOV) and the same frames per second (fps), though some stitching software can handle footage in different formats and fps. The software may also require synchronization 142 of the footage from each camera. The stitching software may provide options for manual synchronization or automated synchronization using audio or a motion signal recorded at the start of capture. The stitching software may also allow users to trim from the timeline of the videos, and to select the specific frames for calibration 144 before stitching 146 the footage from each camera to generate the spherical video data.

In post-processing stage 160, spherical video producers can edit spherical video data using software such as Adobe Premiere® and/or After Effects® from ADOBE® SYSTEMS INCORPORATED; CYBERLINK POWERDIRECTOR®; and FINAL CUT® from APPLE®, Inc.; among others. This spherical video editing software can help a user with making corrections 162 to the spherical video data, such as corrections for radial distortions, exposure differences, vignetting, and the like. In some cases, these corrections can also be made during pre-processing to improve the output of stitching stage 140. Depending on the features of the video editing software, users can also add, modify, or delete certain effects 164, such as edit audio alongside video; add cuts or otherwise rearrange the timeline of the video; add virtual objects or other special effects; add titles, subtitles, and other text; etc. Edits can involve changes to metadata and/or video data. For example, a well-known type of cut or transition is a close-up, which can begin from a far distance and slowly zoom into an object of interest. Video editing software can insert this type of transition by manipulating pixels over a set of frames to produce this effect. Alternatively or in addition, video editing software can alter metadata to create the same or similar effect.

After effects 164 have been added (or modified, removed, etc.), spherical video producers may use the video editing software for export 166 of the spherical video data to a suitable format for presentation. This can involve mapping video data originally captured as spherical point data onto a particular projection, such as an azimuthal projection, a conic projection, or a cylindrical projection, and the like. Other approaches for projecting spherical video data include cube mapping or other polyhedral mapping, paraboloidal mapping, sinusoidal mapping, Hierarchical Equal Area Isolatitude Pixelization (HEALPix), among many other possibilities.

An azimuthal projection projects a sphere directly onto a plane. Variations of the azimuthal projection include the equal-area azimuthal projection, which is a projection that is undistorted along the equator but distortion increases significantly towards the poles; the equidistant azimuthal projection, a projection in which all points are at proportionately correct distances from the center point; the orthographic projection in which all projection lines (e.g., latitudes and meridians of a sphere) are orthogonal to the projection plane; and the stereographic projection, a projection of the entire sphere except at the projection point.

A conic projection projects a sphere onto a cone and then unrolls the cone onto a plane. Variations of the conic projection include the equal-area conic projection, which is a projection that uses two standard parallels such that distortion is minimal between the standard parallels but scale and shape are not preserved; and the equidistant conic projection, which is a projection that uses two standard parallels such that distances along meridians are proportionately correct and distances are also correct along two standard parallels chosen by the projector.

A cylindrical projection projects a sphere onto a cylinder, and then unrolls the cylinder onto a plane. Variations of the cylindrical projection include the equidistant cylindrical projection (sometimes referred to as an equirectangular projection or a geographic projection), which is a projection that maps meridians to vertical straight lines of constant spacing and latitudes to horizontal lines of constant spacing; and the Mercator projection, which is a projection in which linear scale is equal in all directions around any point to preserve the angles and shapes of small objects but distorts the size of the objects, which increase latitudinally from the Equator to the poles.

In cube mapping, a scene is projected onto six faces of a cube each representing an orthogonal 90° view of the top, bottom, left, right, front, and back of the scene. A variation of cube mapping is equi-angular cube mapping in which each face of the cube has more uniform pixel coverage. This can be achieved by plotting saturation maps of the ratio of video pixel density to display pixel density for each direction the viewer is looking (e.g., pixel density ratio (PDR)), and determining the optimal number of pixels to display such that the ratio is as close to 1 as possible for every sampled view direction. Other polyhedron-based mappings may use different polyhedrons (e.g., pyramid, square pyramid, triangular prism, rectangular prism, dodecahedron, etc.).

As one example, spherical video data may be projected onto equirectangular frames using these relationships:

$$x = r \sin \varphi \cos \theta \qquad \text{(Equation 2)}$$

$$y = r \sin \varphi \sin \theta \qquad \text{(Equation 3)}$$

$$z = r \cos \varphi \qquad \text{(Equation 4)}$$

where r is the distance from the origin to a point on a sphere (e.g., the radius of the sphere), $\varphi$ is the polar angle (e.g., the angle r makes with the positive z-axis), and $\theta$ is the azimuth angle (e.g., the angle between the projection of r into the x-y plane and the positive x-axis). These same relationships can be used to project equirectangular frame data back to spherical point data:

$$r = \sqrt{x^2 + y^2 + z^2} \qquad \text{(Equation 5)}$$

$$\varphi = \cos^{-1}\left(\frac{z}{r}\right) \qquad \text{(Equation 6)}$$

$$\theta = \tan^{-1}\left(\frac{y}{x}\right) \qquad \text{(Equation 7)}$$

where r is the radius of the sphere, $\theta$ is the polar angle, $\varphi$ is the azimuth angle, and (x, y, z) is a point in Cartesian space. Other approaches for projecting spherical video data onto other surfaces or volumes (besides an equirectangular frame) may also be used in various embodiments.

In addition to selecting a projection surface, another consideration during export 166 is video resolution. A spherical video frame comprises approximately 4 times the number of pixels of a video frame intended for display on a conventional rectangular display screen. For instance, Table 1 provides examples of video frame resolutions along the horizontal axis and vertical axis, the approximately equivalent conventional video standard (encoded as rectangular frames at a 16:9 ratio), and the approximate number of pixels along the horizontal axis assuming a 2:1 aspect ratio available to display a spherical video frame using a spherical video player (e.g., a head-mounted device) providing an approximate 90° angular field of view. As shown in Table 1, a spherical video frame at HD or 1080p resolution seen through a spherical video player can use approximately as many pixels as a 4K video frame in the conventional video standard, and a spherical video frame at 4K resolution can use approximately as many pixels as a 16K video frame in the conventional video standard.

TABLE 1

| Video Frame Resolutions | | | |
|---|---|---|---|
| Horizontal Axis | Vertical Axis | Video Standard | 360° Player |
| 2000 | 1000 | 1080p or HD (1920 × 1080) | 500 |
| 4000 | 2000 | 4K (3840 × 2160) | 1000 |

TABLE 1-continued

| | Video Frame Resolutions | | |
| --- | --- | --- | --- |
| Horizontal Axis | Vertical Axis | Video Standard | 360° Player |
| 6000 | 3000 | | 1500 |
| 8000 | 4000 | 8K | 2000 |
| | | (7680 × 4320) | |
| 10000 | 5000 | | 2500 |
| 12000 | 6000 | 12K | 3000 |
| | | (11520 × 6480) | |
| 16000 | 8000 | 16K | 4000 |
| | | (15360 × 8640) | |

A related consideration during export 166 is whether to store a spherical video in monoscopic or stereoscopic format. Typical approaches for encoding stereoscopic video are identifying the video as stereoscopic in metadata, and placing left-side and right-side frames on top of one another or next to each other and identifying the frame arrangement in the metadata. This can halve the resolution of each video frame. Other approaches for implementing stereoscopic video may use a single video frame and metadata for translating, rotating, or otherwise transforming the single frame to create a left-side frame and/or the right-side frame.

Export 166 can also include selecting a digital media container for encapsulating the spherical video and video, audio, and still image coding formats and codecs for encoding content. Examples of digital media containers include Audio Video Interleave (AVI) or Advanced Systems Format (ASF) from MICROSOFT® Inc.; Quicktime (MOV) from Apple® Inc.; MPEG-4 (MP4) from the ISO/IEC JTC1 Moving Picture Experts Group (MPEG), Ogg (OGG) from XIPH.ORG™; and Matroska (MKV) from MATROSKA.ORG™; among others.

Examples of digital media coding formats/codecs include Advanced Audio Coding (AAC), MPEG-x Audio (e.g., MPEG-1 Audio, MPEG-2 Audio, MPEG Layer III Audio (MP3), MPEG-4 Audio, etc.) or MPEG-x Part 2 from MPEG; AOMedia Video 1 (AVI) from the ALLIANCE FOR OPEN MEDIA™; Apple Lossless Audio Codec (ALAC) or Audio Interchange File Format (AIFF) from APPLE® Inc.; Free Lossless Audio Codec (FLAC), Opus, Theora, or Vorbis from XIPH.ORG; H.26x (e.g., H.264 or MPEG-4 Part 10, Advanced Video Coding (MPEG-4 AVC), H.265 or High Efficiency Video Coding (HEVC), etc.) from the Joint Video Team of the ITU-T Video Coding Experts Group (VCEG) and MPEG; VPx (e.g., VP8, VP9, etc.) from GOOGLE®, Inc.; and Windows Audio File Format (WAV), Windows Media Video (WMV), or Windows Media Audio (WMA) from MICROSOFT® Inc.; among others.

After post-processing stage 160, the spherical video data may be distributed for playback during presentation stage 180. For example, a recipient can receive the spherical video data over a wide area network (WAN) (e.g., the Internet) using a cellular, satellite, or Wi-Fi connection; a local area network (LAN) (wired or wireless) or other local wireless communication exchange (e.g., BLUETOOTH®, near-field communications (NFC), infrared (IR), ultrasonic, etc.); or other physical exchange (e.g., universal serial bus (USB) flash drive or other disk or drive). Users can view and interact with spherical video content utilizing various types of devices, such as head-mounted display (HMD) 182, computing device 184 (e.g., a server, a workstation, a desktop computer, a laptop computer, a tablet computer, a smart phone, a wearable device (e.g., a smart watch, smart glasses, etc.), etc.), or dedicated media playback device 186 (e.g., digital television, set-top box, DVD player, DVR, video game console, e-reader, portable media player, etc.), and the like. The playback devices will have sufficient processing, memory, storage, network, power, and other resources to run the spherical video playback software and spherical video data, one or more display screens (e.g., integrated within a laptop, tablet, smart phone, wearable device, etc., or a peripheral device) for displaying video data, speakers (integrated or peripheral) for emitting audio data, and input devices (integrated or peripheral) to change perspectives of the spherical video data (e.g., physical directional buttons, touch screen, pointing device (e.g., mouse, trackball, pointing stick, stylus, touchpad, etc.), motion sensors (e.g., accelerometer, gyroscope, etc.), position sensors (e.g., magnetometers, etc.), optical sensors (e.g., charge-coupled device (CCD), complementary metal-oxide-semiconductor (CMOS) sensor, infrared sensor, etc.), microphones, and other sensors and devices).

Figure 2A:
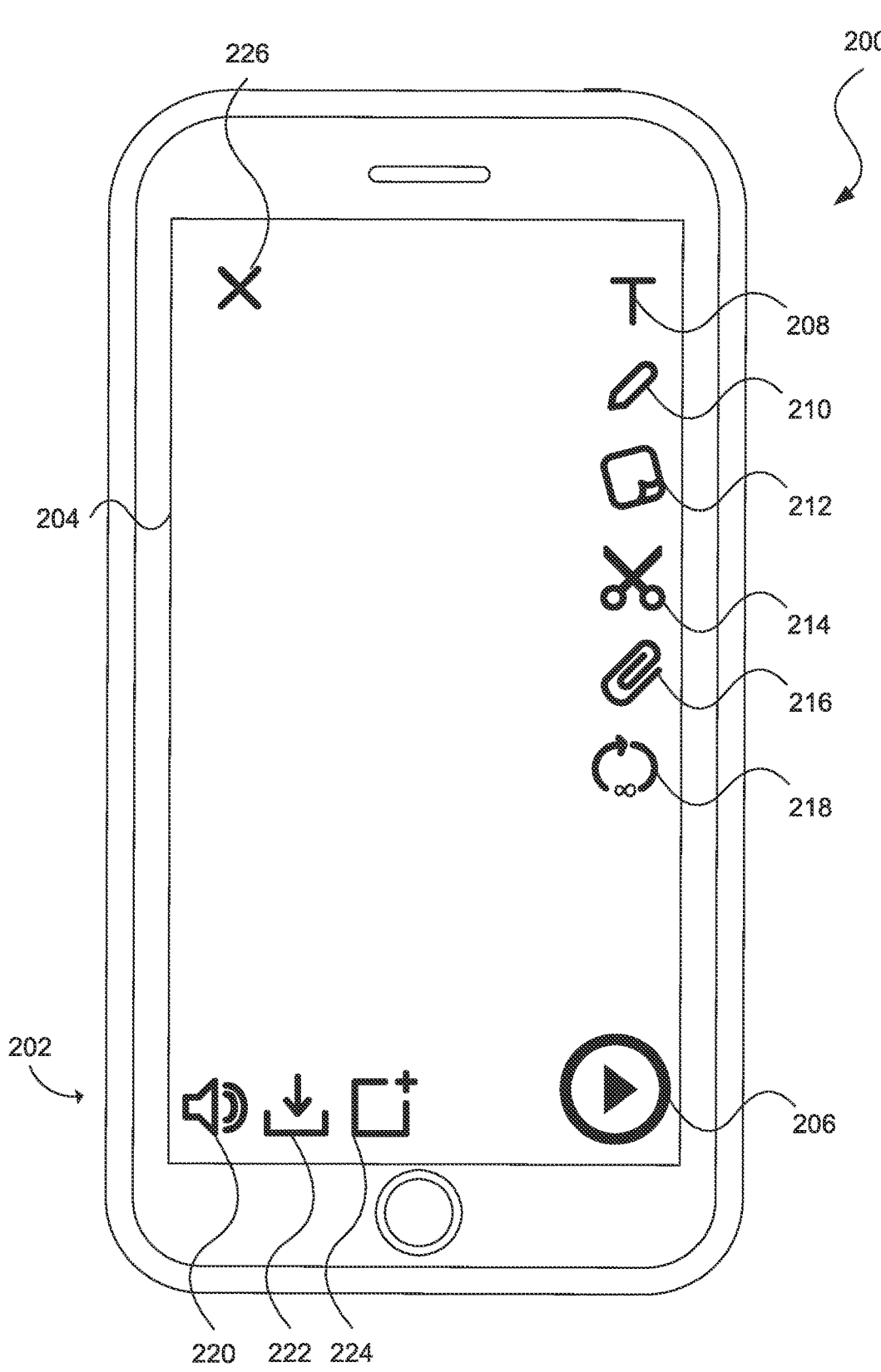
FIGS. 2A and 2B illustrate examples of graphical user interfaces for a client application for a content sharing network in accordance with an embodiment.
Figure 2B:
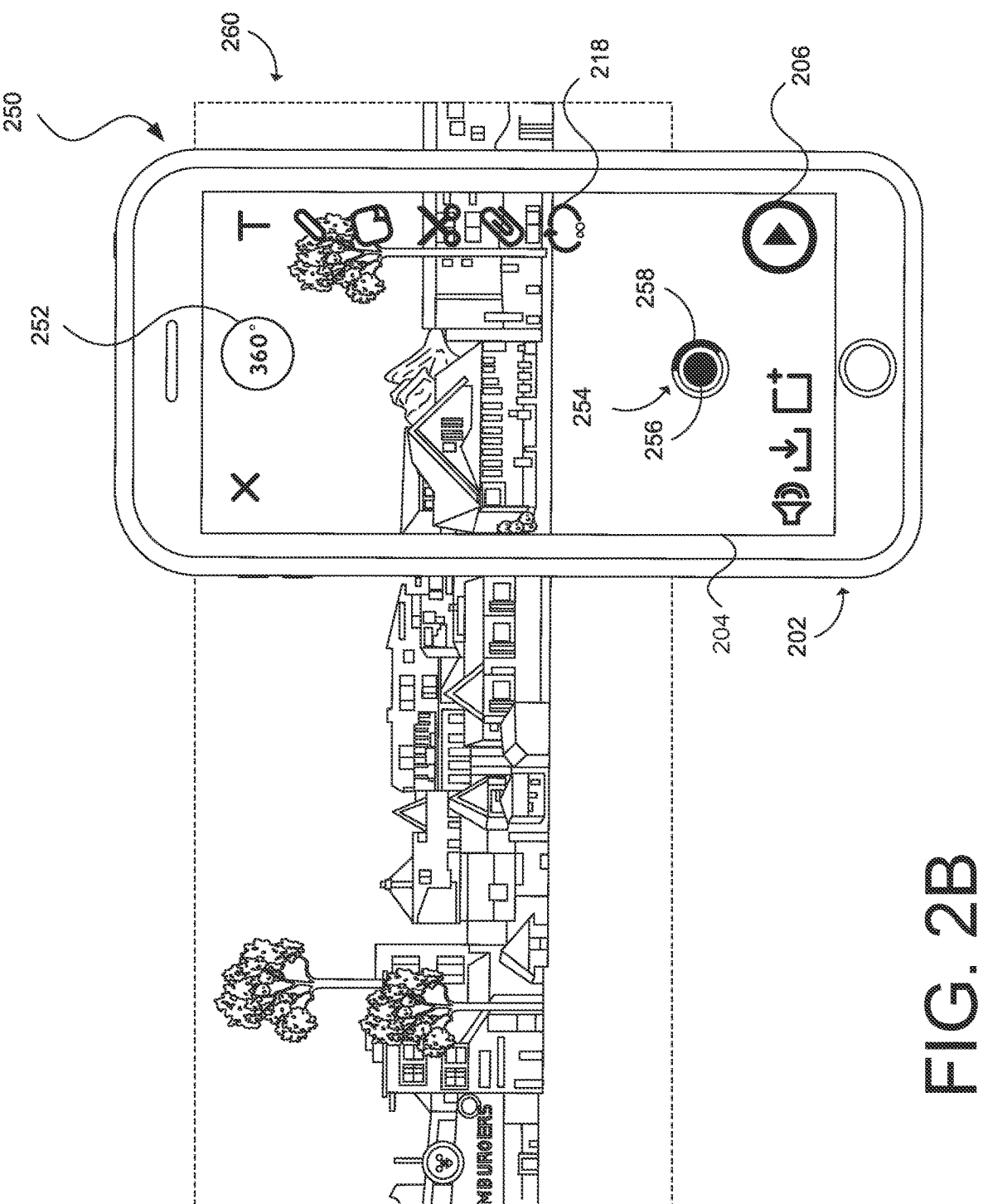

FIGS. 2A and 2B show examples of graphical user interfaces 200 and 250, respectively, of a (e.g., text, image, audio, video, application, etc.) editing and distribution application executing on computing device 202 and displayed on touchscreen 204. Graphical user interfaces 200 and 250 are but one example of a set of user interfaces for a client application for a content sharing network, and other embodiments may include fewer or more elements. For example, other embodiments may utilize user interfaces without graphical elements (e.g., a voice user interface). Examples of the client application include SNAPCHAT® or SPECTACLES™ from SNAP® Inc. However, the present disclosure is generally applicable to any application for creating and editing content (e.g., text, audio, video, or other data) and sharing the content with other users of a content sharing network, such as social media and social networking; photo, video, and other sharing; web logging (blogging); news aggregators; content management system platforms; and the like.

In this example, the client application may present graphical user interface 200 in response to computing device 202 capturing spherical video data or computing device 202 receiving the spherical video data from another electronic device and presenting the spherical video data within the content sharing network client application, an electronic communication client application (e.g., email client, Short Message Service (SMS) text message client, instant messenger, etc.), a web browser/web application, a file manager or other operating system utility, a database, or other suitable application. Graphical user interface 200 includes video icon 206, which may be associated with an interface for sending the spherical video data, a portion of the spherical video data, or an edited version of the spherical video data to local storage, remote storage, and/or other computing devices.

Graphical user interface 200 also includes various icons that may be associated with specific functions or features of the client application, such as text tool icon 208, drawing tool icon 210, virtual object editor icon 212, scissors tool icon 214, paperclip tool icon 216, timer icon 218, sound tool icon 220, save tool icon 222, add tool icon 222, and exit icon 224. Selection of text tool icon 208, such as by computing device 202 receiving a touch or tap from a physical pointer or a click from a virtual pointer, can cause computing device 202 to display a text editing interface to add, remove, edit, format (e.g., bold, underline, italicize, etc.), color, and resize text and/or apply other text effects to the video. In response to receiving a selection of drawing tool icon 210, computing device 202 can present a drawing editor interface for selecting different colors and brush sizes for drawing in the video;

adding, removing, and editing drawings in the video; and/or applying other image effects to the video.

Scissors tool icon 214 can be associated with a cut, copy, and paste interface for creating "stickers" or virtual objects that computing device 202 can incorporate into the video. In some embodiments, scissors tool icon 214 can also be associated with features such as "Magic Eraser" for deleting specified objects in the video, "Tint Brush" for painting specified objects in different colors, and "Backdrop" for adding, removing, and/or editing backgrounds in the video. Paperclip tool icon 216 can be associated an interface for attaching websites (e.g., URLs), search queries, and similar content in the video. Timer icon 218 can be associated with an interface for setting how long the video can be accessible to other users. Selection of sound tool icon 220 can result in computing device 202 presenting interface for turning on/off audio and/or adjust the volume of the audio. Save tool icon 222 can be associated with an interface for saving the video to a personal or private repository of photos, images, and other content (e.g., referred to as "Memories" in the SNAPCHAT® application). Add tool icon 224 can be associated with an interface for adding the video to a shared repository of photos, images, and other content (e.g., referred to as "Stories" in the SNAPCHAT® application). Selection of exit icon 226 can cause computing device 202 to exit the video editing mode and to present the last user interface navigated to in the client application.

FIG. 2B shows graphical user interface 250, which computing device 202 may display upon the client application entering a video editing mode. Graphical user interface 250 can include 360° icon 252 to indicate that the current video being played or edited includes spherical video data. Graphical user interface 250 also includes graphical user interface element 254 comprising two elements, recording button 256 and scrubber 258. Recording button 256 can indicate that the client application is recording a copy of the spherical video data currently being presented by the application. For example, a user may press touchscreen 204 at the area corresponding to recording button 256 for a specified period of a time (e.g., 1 s, 2 s, etc.) to cause the client application to display graphical user interface element 254. In some embodiments, the client application may buffer video data for the specified period of time upon initially receiving a potential recording input to ensure that that portion of the video is recorded, and discard the buffered video data after the specified period of time if the client application has stopped receiving the recording input (e.g., the user lifts his finger off touchscreen 204) or otherwise receives an input associated with pausing or stopping editing or recording (e.g., a double tap to computing device 202). In this manner, the client application can ignore false positive recording inputs. In addition, the specified period of time can operate as a minimum recording length.

In other embodiments, the user may press touchscreen 204 in the general area corresponding to graphical user interface element 254 (e.g., below timer icon 218 and above video icon 206 and the other bottom-aligned icons) and/or other portions of touchscreen 204 not associated with an icon or other user interface element (e.g., below 360° icon 252, to the left of timer icon 218 and the other right-aligned icons, and above video icon 206 and the other bottom-aligned icons). In some embodiments, graphical user interface element 254 may always be displayed when the client application is in video editing mode but recording button 256 will be translucent (or a first color) until the client application receives a recording input and recording button

256 will become opaque (or a second color) to indicate the client application is recording.

Scrubber 258 can indicate the amount of time of the spherical video data that has elapsed relative to the total length of the spherical video data. For example, scrubber 258 is illustrated in this example as a ring including a 240° arc starting from the top of the ring and traveling in a counterclockwise direction that is translucent (or the first color), and a 120° arc starting from the top of the ring and traveling in a clockwise direction that is opaque (or the second color). If the top of the ring represents the start of the spherical video and forward progress is represented by the ring turning from translucent to opaque (or the first color to the second color), then scrubber 258 indicates about one third of the spherical video data has elapsed. In addition to indicating progress, a user can use scrubber 258 to advance the spherical video data by performing a left swipe or clockwise swipe and reverse the spherical video by performing a right or counterclockwise swipe. The user may continue recording while forwarding or rewinding the spherical video by maintaining contact with touchscreen 204 and performing the swipe using the same point of contact or using a second point of contact (e.g., if the touchscreen supports multi-touch).

In the example of FIG. 2B, computing device 202 displays a portion of equirectangular frame 260 within touchscreen 204. Equirectangular frame 260 includes other portions of the scene (indicated in dashed line) that are not displayed within touchscreen 204 but are accessible by directing movement from the current perspective of the scene to a different perspective of the scene. The client application can detect this movement data using various input mechanisms, such as keyboard input components (e.g., directional keys of a physical keyboard, a touch screen including a virtual keyboard, a photo-optical keyboard, etc.), pointer-based input components (e.g., a mouse, a touchpad, a trackball, a joystick, or other pointing instruments), motion sensors (e.g., accelerometers, gravity sensors, gyroscopes, rotational vector sensors, etc.), position sensors (e.g., orientation sensors, magnetometers, etc.), tactile input components (e.g., a physical button, a touch screen that provides location and/or force of touches or touch gestures, etc.), audio input components (e.g., a microphone for providing voice commands), high frequency input components (e.g., ultrasonic, sonar, radar transceivers, etc.), optical input components (e.g., CCD or CMOS cameras, infrared cameras, Lidar systems and other laser systems, LED transceivers, etc. for detecting gestures based on movement of a user's eyes, lips, tongue, head, finger, hand, arm, foot, leg, body, etc.); and combinations of these types of input components.

In some embodiments, movement input data may also be based on the content displayed on a display screen, such as a selection to track a moving object represented in the spherical video data; a selection of a path, pattern, or other movement data for navigating the spherical video data; or alphanumeric text (e.g., map directions, a list of coordinates, etc.); among many other possibilities.

Figures 3A, 3B, 3C, 3D:
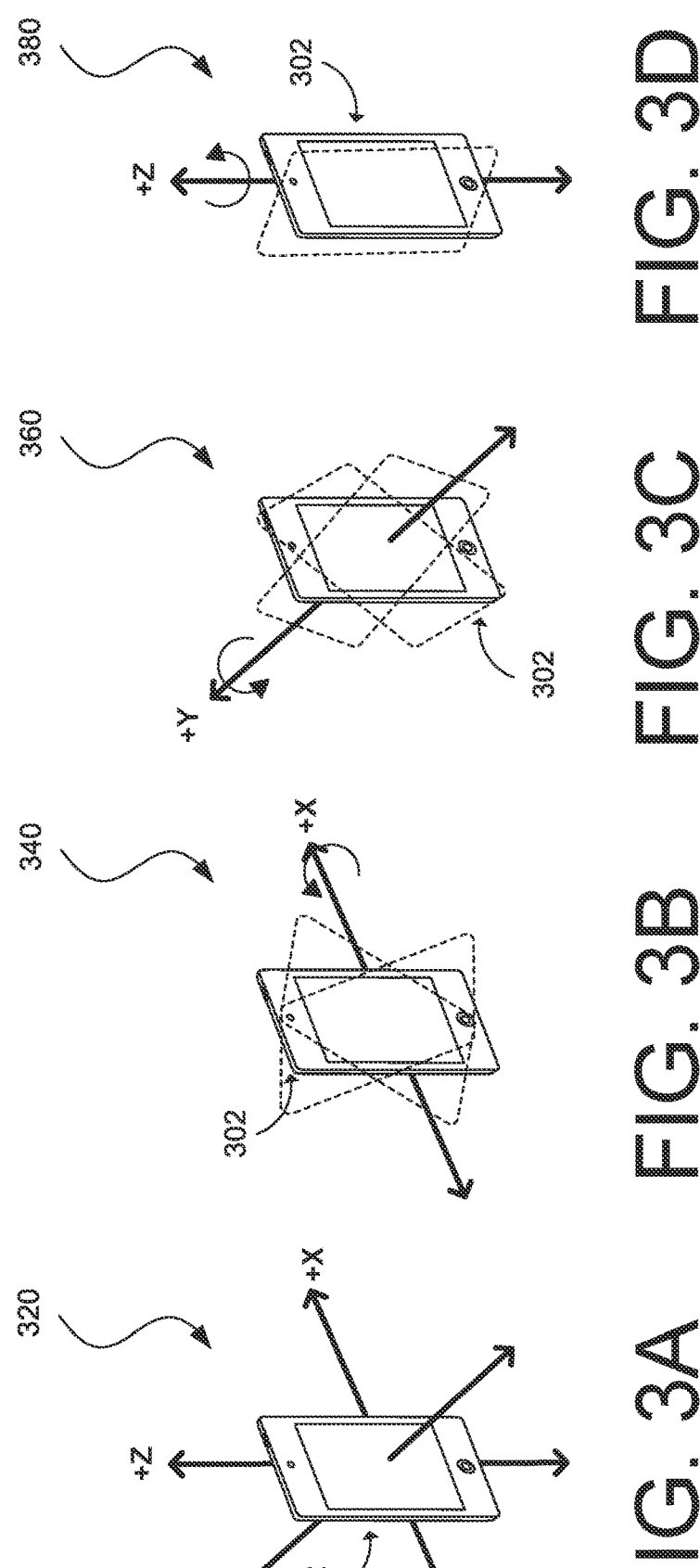
FIGS. 3A-3D illustrate an example of an approach for determining movement data for controlling a viewport into spherical video data in accordance with an embodiment.

FIGS. 3A-3D show an example of an approach for determining movement data for controlling a viewport into spherical video data to display on a display screen of computing device 302. Computing device 302 may be associated with an angular field of view smaller than the angular field of view of the spherical video data. In this example, computing device 302 can move about six degrees of freedom, including translations along three perpendicular axes (x-, y-, and z-axis) and rotations about the three perpendicular axes. In particular, FIG. 3A shows in example 320 that computing device 302 can move, with the four corners generally equidistant to a user, from left to right and right to left (e.g., along the x-axis toward x+ and away from x+, respectively), forward and backward and backward and forward (e.g., along the y-axis toward y+ and away from y+, respectively), and up and down and down and up (e.g., along the z-axis toward z+ and away from z+, respectively). FIG. 3B shows in example 340 that computing device 302 can roll (e.g., tip forward such that the bottom corners of the device are closer to the user than the top corners and backward such that the top corners of the device are closer to the user than the bottom corners; rotate about the x-axis). FIG. 3C shows in example 360 that computing device 302 can pitch (e.g., tilt counterclockwise such that the top right corner is the highest corner or clockwise such that the top left corner is the highest corner; rotate about the y-axis). FIG. 3D shows in example 380 that computing device 302 can yaw (e.g., twist right such that the left corners of the device are closer to the user than the right corners and left such that the right corners are closer to the user than the left corners; rotate about the z-axis). Each type of movement (e.g., one of the translations shown in FIG. 3A or rotations shown in FIG. 3B-3D) can be joined with one or more of the other types of movement to define a sphere representing the three-dimensional space the device can move from one pose (e.g., position and orientation) to the next.

In some embodiments, computing device 302 can include one or more motion and/or position sensors (e.g., accelerometers, gyroscopes, magnetometers, etc.), optical input components (e.g., CCD camera, CMOS camera, infrared camera, etc.), and/or other input components (not shown) to detect the movement of the device. Examples for using these sensors to determine device movement and position include the Sensors or Project Tango™ application programming interfaces (APIs) or the Augmented Reality Core (ARCore) software development kit (SDK) for the ANDROID™ platform, the CoreMotion or Augmented Reality Kit (ARKit) frameworks for the IOS® platform from APPLE®, Inc., or the Sensors or Mixed Reality APIs for the various MICROSOFT WINDOWS® platforms. These APIs and frameworks use visual-inertial odometry (VIO), which combines motion and position sensor data of the computing device and image data of the device's physical surroundings, to determine the device's pose over time. For example, a computing device implementing one of these APIs or frameworks may use computer vision to recognize objects or features represented in a scene, track differences in the positions of those objects and features across video frames, and compare the differences with motion and position sensing data to arrive at more accurate pose data than using one motion tracking technique alone. The device's pose is typically returned as a rotation and a translation between two coordinate frames. The coordinate frames do not necessarily share a coordinate system but the APIs and frameworks can support multiple coordinate systems (e.g. Cartesian (right-handed or left-handed), polar, cylindrical, world, camera, projective, OpenGL from KHRONOS GROUP®, Inc., UNITY® software from UNITY TECHNOLOGIES™, UNREAL ENGINE® from EPIC GAMES®, etc.).

FIGS. 4A-4G show an example of an approach for editing spherical video data using computing device 402. In this example, computing device 402 displays the spherical video data on touchscreen 404a, the contents of which are represented in viewport 404b. The spherical video data, in these examples, is encoded in monoscopic format lacking depth information such that control of the viewport is limited to three degrees of freedom. In other embodiments, the spherical video data may include stereoscopic video data, three-dimensional (3D) virtual reality environment data or other computer-generated data, next-generation video resolution data, and other information for conveying or extrapolating depth such that viewport 404b can move about according to six degrees of freedom.

A user can initiate playback of the spherical video data, such as by selecting video icon 206. In these examples, the client application can support edits based on input movement data processed by computing device 402, such as the movement of the device detected by motion sensors, position sensors, optical sensors, and other sensors or components. Here, viewport control is limited to three degrees of freedom such that the client application may be configured to detect rotations (e.g., roll, pitch, and yaw) of the device to change the position of the viewport into the spherical video data displayed on touchscreen 404a. Other embodiments may use translations in Cartesian space, spherical space, cylindrical space, or other suitable coordinate system for controlling the position of the viewport into the spherical video data. The user may initiate editing mode or recording mode, such as by holding down recording button 256 of FIG. 2A, tapping recording button 256, uttering a voice command to begin recording, or providing another suitable input. The may user stop editing or recording, by releasing recording button 256, re-tapping recording button 256, uttering a voice command to stop recording, or providing another suitable input. Computing device 402 can detect its movements to change the position of viewport 404b, and the device's pose data and/or the content displayed within the viewport can be recorded.

Figure 4A:
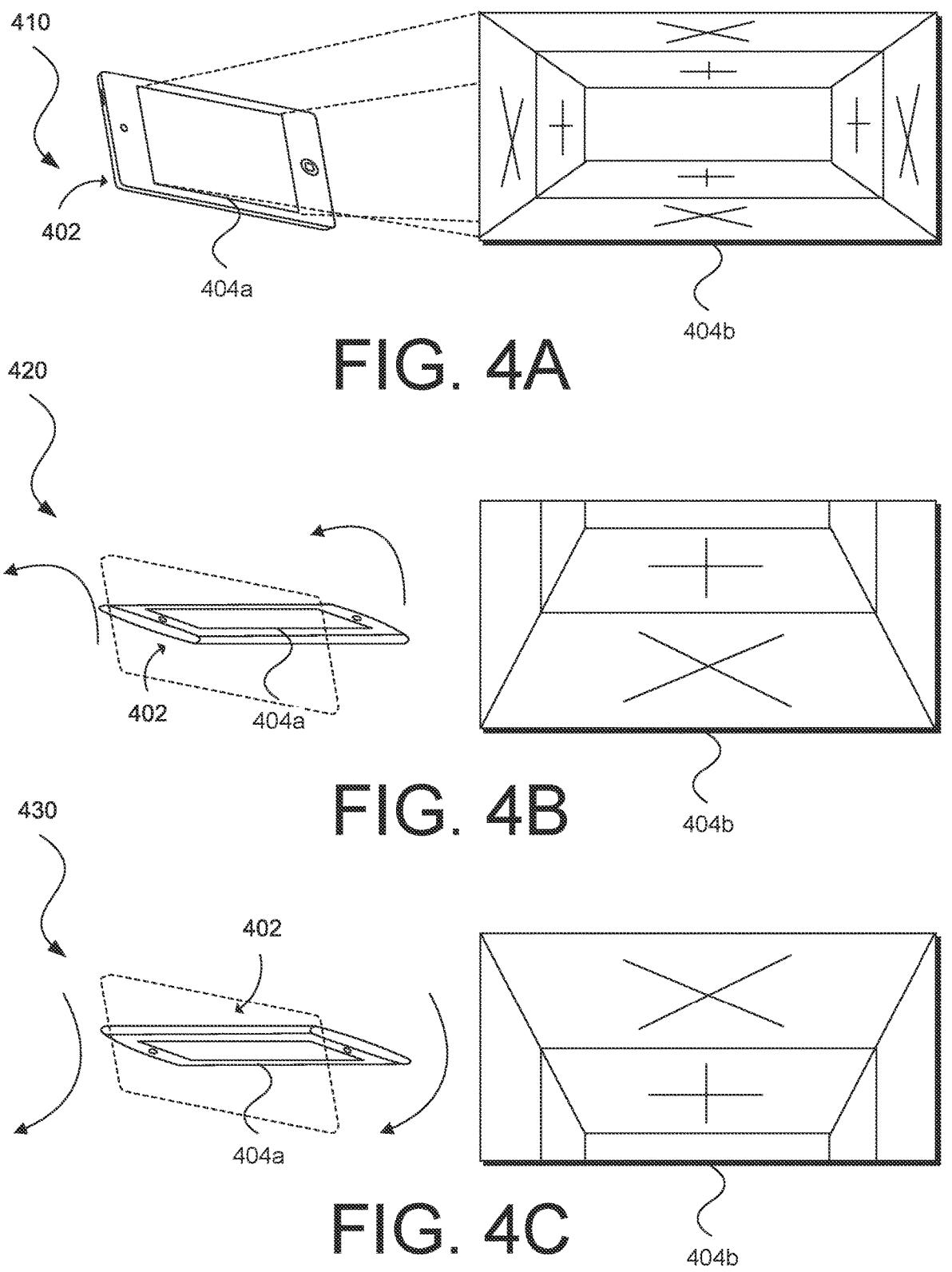

For instance, FIG. 4A shows example 410 of an initial pose of computing device 402 in which the gaze of the user may be substantially orthogonal to touchscreen 404a such that the four corners of the device are substantially equidistant to the user, and that viewport 404b includes a full view of a rectangular tunnel having portions that appear closer to the user marked by x's and portions further from the user marked by +'s. FIG. 4B shows example 420 in which the user has tipped computing device 402 forward from the initial pose (e.g., rotated computing device 402 in a clockwise direction about the horizon) such that the bottom corners of the device are closer to the user than the top corners, and viewport 404b displays a view centered on the bottom of the tunnel. FIG. 4C shows example 430 in which the user has tipped computing device backward from the initial pose (e.g., rotated computing device 402 in a counterclockwise direction about the horizon) such that the top corners of the device are closer to the user than the bottom corners, and that viewport 404b includes a view centered on the top of the tunnel.

Figures 4D, 4E, 4F, 4G:
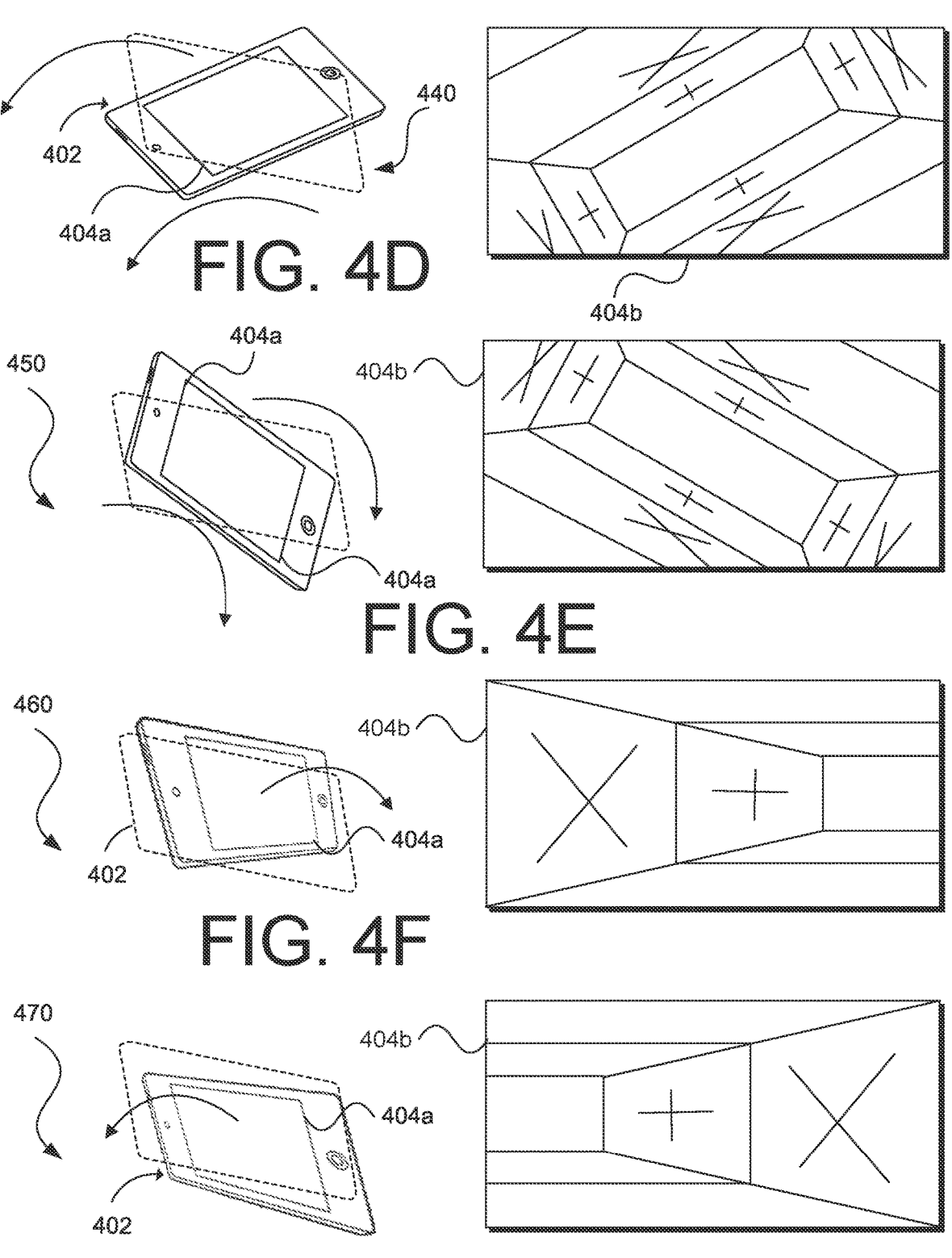

FIG. 4D shows example 440 in which the user has turned the right side of computing device 402 upward from the initial pose (e.g., rotated computing device 402 in a counterclockwise direction along an axis into the tunnel) such that the top right corner is the highest corner, and that viewport 404b displays an aslant view (e.g., sloping upward relative to the horizon) of the tunnel. FIG. 4E shows example 450 in which the user has turned the left side of computing device 402 upward from the initial pose (e.g., rotated computing device 402 in a clockwise direction along an axis into the tunnel) such that the left top corner is the highest corner, and that viewport 404b includes an askew view (e.g., sloping downward relative to the horizon) of the tunnel.

FIG. 4F shows example 460 in which the user has twisted computing device 402 to the right from the initial pose (e.g., rotated computing device 402 in a counterclockwise direction about an axis perpendicular to the horizon and planar with touchscreen 404a) such that the left corners are closer to the user than the right corners, and that viewport 402b displays a view centered on the left side of the tunnel. FIG. 4G shows example 470 in which the user has twisted computing device 402 to the left from the initial pose (e.g., rotated computing device 402 in a clockwise direction about the axis perpendicular to the horizon and planar with touchscreen 404a) such that the right corners of the device are closer to the user than the left corners, and that viewport 404b includes a view centered on the right side of the tunnel.

While these example describe the user tilting, turning, or twisting computing device 402, other motions, such as the movement of the user's head or changes in direction of the user's gaze can also be used in other embodiments. For example, the user turning his head or the direction of his gaze leftward may result in viewport 404b showing a similar perspective as example 460 of FIG. 4F (e.g., a view centered on the left side of the tunnel), and turning his head or the direction of his gaze rightward may result in viewport 404b showing a similar perspective as example 470 of FIG. 4 (e.g., a view centered on the right side of the tunnel). As another example, an upward drag gesture with a mouse or an upward swipe touch gesture may result in viewport 404b showing a similar perspective as example 420 of FIG. 4B (e.g., a view centered on the bottom of the tunnel), and conversely, a downward drag gesture with the mouse or a downward swipe touch gesture may result in viewport 404b showing a similar perspective as example 430 of FIG. 4C (e.g., a view centered on the top of the tunnel).

Some embodiments may use voice or other audio commands, physical or virtual keys or buttons, alphanumeric text (e.g., map directions, GPS coordinates, etc.), and the like, in addition to or alternatively from motion sensors, position sensors, and cameras for navigating spherical video data. For example, an audio command or a selection of a physical or virtual key or button to rotate the view counterclockwise about an axis into the tunnel may result in viewport 404b displaying a similar perspective as example 440 of FIG. 4D (e.g., an aslant view of the tunnel), and a command to rotate the view clockwise about the axis into the tunnel may result in viewport 404b showing a similar perspective as example 450 of FIG. 4E (e.g., an askew view of the tunnel).

Some embodiments may use content displayed on touchscreen 404a for changing the perspective shown in viewport 404b. For example, the spherical video data may include a representation of an object of interest and the client application can support tracking of the object of interest across the frames of the spherical video data. As another example, the client application can enable a user to select a path, pattern, or other movement for navigating the viewport into the spherical video data. As yet another example, the client application can receive alphanumeric text (e.g., map directions, a set of coordinates, etc.) for controlling the viewport into the edited video.

Figure 5A:
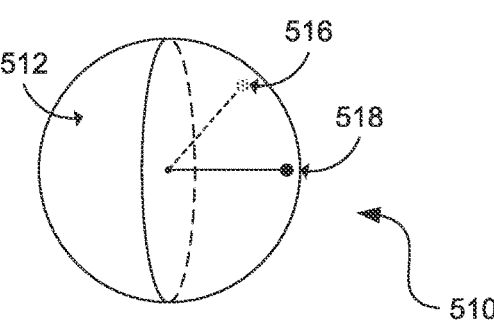
FIG. 5A-5F illustrate examples of approaches for representing video edited from spherical video data based on input movement data for controlling a viewport into the video in accordance with an embodiment.

FIGS. 5A-5F show examples of approaches for representing video edited from spherical video data based on input movement data for controlling a viewport into the video. FIG. 5A shows example 510 of a conceptual representation of a frame of spherical video data, frame 512, and points on the sphere, points 516 and 518. In this example, point 516 may correspond to the original centroid of the viewport (e.g., viewport 404b of FIG. 4A-4G) that a computing device (e.g., computing device 402) uses to display a portion of frame 512. For instance, frame 512 is a 360° spherical video frame while the computing device may have a display screen associated with an angular field of view less than 360°. Point 512 can be a relative value (e.g., relative to an origin, relative to a centroid of the previous frame, etc.) or an absolute value (e.g., polar coordinate, spherical coordinate, Cartesian coordinate, GPS coordinate, etc.). Point 512 can be an implicit value (e.g., a default value or the value of the centroid of the previous frame if undefined for frame 512) or an explicit value (e.g., defined for frame 512 in the metadata). In some embodiments, point 512 can be derived from certain metadata (e.g., the metadata for frame 512 can define a set of coordinates mapping a portion of frame 512 to the viewport, the metadata can include the length and width of frame 512 if frame 512 is projected onto a rectangular frame, etc.).

Point 518 can correspond to the new centroid of the viewport for frame 512 based on input movement data during editing mode. For example, if the user is recording a copy of spherical video data during playback and rotates his device to cause a different portion of the scene to be seen through the viewport, the amount of rotation, translation, and/or transformation of frame 512 to recreate the movement during playback of the copy of the spherical video data can be represented by point 518. In this example, none of the pixels of frame 512 are modified to generate the copied frame but metadata can be injected (if no centroid was previously defined) or edited to indicate which portion of the copy of frame 512 to center on during playback of the edited/copied video.

Figure 5B:
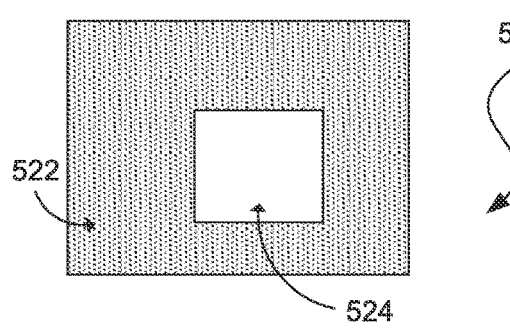

As discussed, playback of spherical video data can consume significant amounts of resources (e.g., processing, memory, storage, network, power, and other computing resources). This can adversely affect the performance of computing devices, especially portable computing devices that have may have fewer computing resources relative to desktops and servers. In some embodiments, changes to the spherical video frames can also include trimming at least portions of the frames that are not displayed within a viewport. For instance, FIG. 5B shows example 520 of a frame of spherical video data projected onto equirectangular frame 522. In this example, a portion of frame 522, cropped frame 524 (e.g., the white portion), is the portion of frame 522 that is displayed by the computing device during editing mode. Cropped frame 524 is stored as a new frame of the edited copy while the remaining portion of frame 522 (e.g., the gray portion) is cropped out. In an embodiment, the client application can retrieve the contents of a graphics buffer for the video data for the new frame. In other embodiments, the client application may retrieve the video data for the new frame from memory or storage.

Figure 5C:
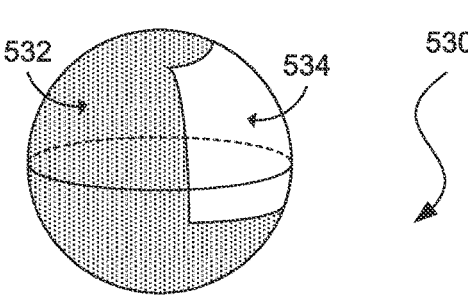

Although example 520 illustrates a frame of spherical video data projected onto an equirectangular frame, other embodiments may preserve frames in the spherical coordinate system. For instance, FIG. 5C shows example 530 in which plate 534 is cropped from spherical video frame 532. Still other embodiments may use other types of projections or mappings (e.g., cylindrical projection, cube mapping, etc.). FIGS. 5A and 5C-5F depict spherical video frames 532, 542, 552, and 562 as spheres for conceptual purposes but these frames may be projected onto any suitable surface or volume or may not be projected at all. Some embodiments also support stereoscopic spherical video editing using similar techniques but accounting for a left-side frame and a right-side frame for each video frame.

Figure 5D:
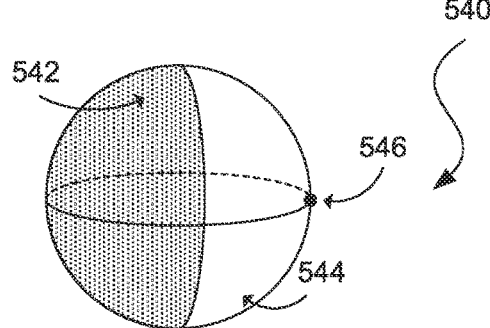
Figure 5E:
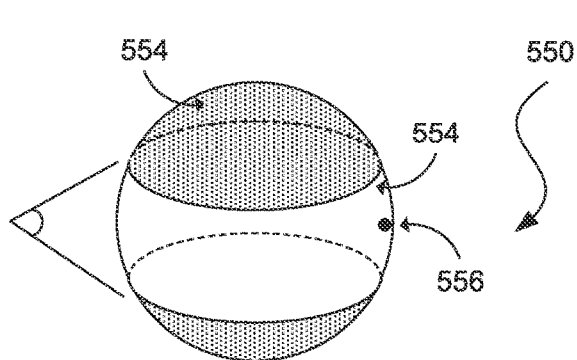
Figure 5F:
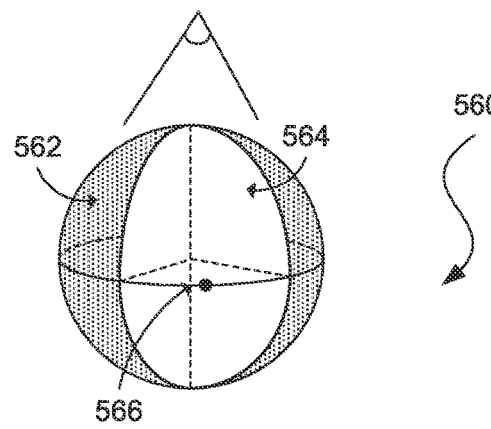

In addition, not all embodiments crop spherical video data down to the displayed portion during editing. In some embodiments, other cropping strategies may be used to reduce the size of the frames in the edited copy but preserve some undisplayed portions for continuing to support at least some interactivity during playback. FIG. 5D shows example 540 in which hemisphere 544 is cropped from spherical video frame 542. On playback of the edited copy, the view of the viewport can be centered on centroid 546 and allow three degrees of freedom of movement up to 90° from the centroid for spherical video data lacking depth information and six degrees freedom of movement up to 90° from the centroid for spherical video data with depth information. FIG. 5E shows example 550 in which band 554 is cropped from spherical video frame 552. On playback of the edited copy, the view of the viewport can be centered on centroid 556 and allow one degree of freedom of movement about the axis running through the poles (assuming θ is approximately 90° and the angular field of view of the display screen is approximately 90°). That is, the computing device can detect left and right twists to change the position of the viewport into the spherical video data but may ignore forward, backward, left, and right tips. FIG. 5F shows example 560 in which semi hemisphere 564 is cropped from spherical video frame 562. On playback of the edited copy, the view of the viewport can be centered on centroid 566 and allow one degree of freedom of movement about the equator (assuming θ is approximately 90° and the angular field of view of the display screen is approximately 90°). That is, the computing device can detect forward and backward tips to change the position of the viewport into the spherical video data but may ignore left and right tips and twists.

Figure 6:
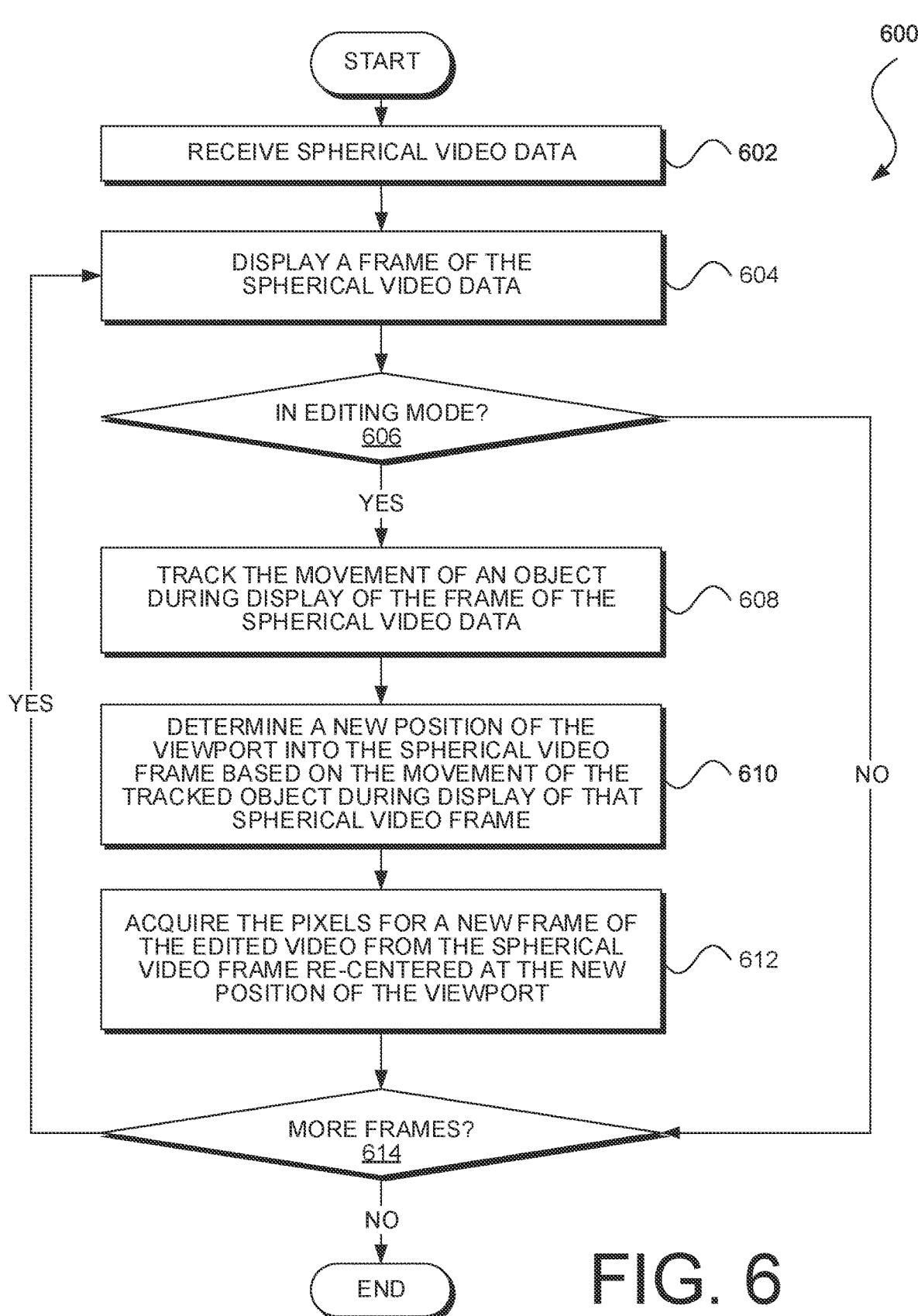
FIG. 6 illustrates an example of a process for editing spherical video data based on input movement data for controlling a viewport into the video in accordance with an embodiment.

FIG. 6 shows process 600, an example of a process for editing a spherical video based on movement data controlling a viewport into the spherical video. A computing device (e.g., computing device 1300 of FIG. 13), and more particularly, an application (e.g., client application 1234 of FIG. 12) executing on the computing device may perform process 600. Process 600 may begin at step 602, in which the computing device receives spherical video data for playback on the device. The computing device can receive the spherical video data from a built-in spherical video capturing system or from another device (e.g., as an attachment to an email or other electronic communication, as a download from the Internet, as a transmission over a local wireless communication channel (e.g., Wi-Fi, BLUETOOTH®, near field communication (NFC), etc.), from a USB flash drive or other disk or drive, and the like).

At step 604, the computing device can display the spherical video data frame by frame based on the video's fps (e.g., 24 fps, 48 fps, 60 fps, etc.). The spherical video data may be associated with an angular field of view (e.g., 180°, 270°, 360°) greater than the angular field of view (e.g., 60°, 90°, 120°, etc.) associated with the display screen/touchscreen/head-mounted display (e.g., display element) of the computing device such that the display element operates as a viewport into the spherical video data at a particular position (e.g., an origin, the intersection of the prime meridian and equator of the sphere, the centroid of the viewport, etc.). The spherical video data may be projected or mapped onto various types of surfaces and volumes (e.g., equirectangular frame, cylindrical frame, cube map, etc.). The spherical video data may comprise various resolutions (e.g., 1920×1080, 2560×1440, 3840×2160, etc.) including a uniform resolution (e.g., same resolution throughout the frame) or a foveated resolution (e.g., varying across the frame with one or more regions that are higher resolution than other regions) or other varying resolution. The spherical video data may be monoscopic or stereoscopic.

As the spherical video data is displayed, the computing device can proceed to step 606 in which the device can determine whether it is in a spherical video editing/re-recording mode. For example, the device can determine it is in the editing/re-recording mode within a duration between when it has received a first input associated with editing the spherical video data and when it has received a second input associated with stopping editing/recording of the spherical video data. In some embodiments, the first input may include continuous contact with a region of a touchscreen of the computing device (e.g., recording button 256 of FIG. 2B; the region of touchscreen 204 below 360° icon 252, to the left of timer icon 218 and the other right-aligned icons, and above video icon 2067 and the other bottom-aligned icons; etc.) and the second input may include discontinuing contact with that region of touchscreen 204. In other embodiments, the computing device can detect various other types of inputs to initiate editing/recording (e.g., actuation of one or more physical or virtual keys or buttons, voice commands, touch gestures, hand gestures, eye gestures, head gestures, body gestures, device motion gestures, etc.), and the same or similar inputs to pause or stop editing/re-recording. If no editing/re-recording input is received, the client application continues to step 614 to determine whether the spherical video data includes any more frames.

While in editing/re-recording mode, the computing device may continue to step 608 in which the computing device tracks the movement of an object for controlling the position of the viewport. For example, a forward rotation of the device can move the viewport downward as shown in FIG. 4B, a backward rotation can move the viewport upward as shown in FIG. 4C, a rotation of the device to the right can move the viewport to the left as shown in FIG. 4F, a rotation to the right can move the viewport to the right as shown in FIG. 4G, twisting the device to the left can move the viewport diagonally and sloping upward as shown in FIG. 4D, and a twist to the right can move the viewport diagonally and sloping downward as shown in FIG. 4E. In addition, if the angular field of view associated with the edited/re-recorded video data is less than or equal to the angular field of view of the display, the viewport can make up the entire frame of the edited/re-recorded video data. On the other hand, if the angular field of view associated with the edited/re-recorded video is greater than the angular field of view associated with the display, each frame of the edited/re-recorded video can be centered at the new position of the viewport.

In some embodiments, the tracked object can be the computing device itself. The computing device can detect its movement using visual-inertial odometry (VIO) techniques or a combination of motion/position/orientation sensors (e.g., accelerometers, gyroscopes, magnetometers, etc.) and optical sensors (e.g., CCD or CMOS cameras, infrared transceivers, etc.) for determining device motion and position. As the device tracks its own movement (or movement relative to its environment), the position of the viewport into the spherical video data may change in response to the movement. For example, if the computing device detects a rotation about the horizon as shown in FIGS. 4B and 4C, the viewport into the spherical video data may change similarly to examples 420 and 430, respectively. Similarly, rotations about an axis orthogonal to the plane of the device as shown in FIGS. 4D and 4E can change the position of the viewport to that of examples 440 and 450, respectively, and rotations about an axis planar to the device and perpendicular to the horizon as shown in FIGS. 4F and 4G can change the position of the viewport to that of examples 460 and 470, respectively.

In other embodiments, the tracked object can be the eyes, lips, tongue, head, finger, hand, arm, foot, leg, body, and/or other portion of the user or other object to which the computing device is mounted or incorporated (e.g., drone, smart car, etc.). In addition to visual-inertial odometry, various other techniques may also be used for tracking an object, such as capacitive sensing, inductive sensing, magnetic sensing, radar, Lidar, sonar, or ultrasonic sensing, among many possibilities. The tracked object is not necessarily a physical object in certain embodiments. For example, the tracked object can also include an object represented in the spherical video data (real or virtual) and can be tracked using computer vision techniques for tracking objects, such as optical flow (e.g., dense optical flow, Dual total variation (TV) (resp. $L^1$ norm), Fameback optical flow, sparse optical flow, etc.), Kalman filtering, boosting (e.g., AdaBoost), neural networks (e.g., GOTURN), kernelized correlation filters (KCF), median flow, multiple instance learning (MIL), tracking, learning, and detection (TLD), or other suitable object tracking algorithm.

Process 600 can continue to step 610 in which the client application can calculate the new position of the viewport into the spherical video data based on a movement of the tracked object. In some embodiments, the movement data can be stored as a mapping of frame to centroid (e.g., polar coordinate, cylindrical coordinate, equirectangular coordinate, GPS coordinate, etc.) representing the new position of the viewport into the spherical video. The movement data can include absolute values based on a defined coordinate system or relative values that depend on the centroid for a preceding video frame. In other embodiments, the movement data may include rotation, translation, and/or transformation information for re-centering the viewport to the new position. The movement data can be injected as metadata into the edited video (if undefined in the spherical video data), or the client application may update the metadata of the spherical video data for the edited video. In still other embodiments, the movement data may define a surface or volume to extract from the original spherical video frame for the corresponding frame of the edited copy.

As discussed with respect to FIGS. 5D-5F, the spherical video frame extracted for the edited copy is not necessarily limited to the angular field of view of the display screen of the computing device, and can also include surfaces or volumes of other dimensions that truncate or crop portions of the spherical video to reduce its size but preserve some interactivity or "immersiveness." In some embodiments, the client application or a server that it communicates with can enact a dynamic transmission scheme for distributing an edited video to other users' computing devices. For example, the client application or the server can receive movement data corresponding to how the spherical video data editor has redirected the viewport into the spherical video. The client application or the server can determine the extent and availability of other users' computing resources (e.g., processing, memory, storage, network bandwidth, power supply, etc.) and stream or transmit the version of the edited video most suitable for those users' computing devices. If another user's computing device has sufficient resources, the client application or server can distribute the full edited version of the spherical video data (e.g., 360° video at full resolution with metadata indicating how to rotate/translate/warp the original spherical video frame to generate the new frame defined by the editor). If network bandwidth is low or the other user's computing device otherwise lacks the resources to playback the full edited version of the spherical video data, the client application can send a cropped version of the edited video, a lower resolution version, a version with a lower fps rate, a foveated version, a combination of these approaches, or other smaller version. The sending user and receiving user may also configure the version during editing and/or distribution.

At step 612, the client application can evaluate whether the spherical video data contains any more frames. If there are additional frames, process 600 can repeat steps 604-612. If there are no additional frames, process 600 may conclude. In some embodiments, the computing device may also send the edited video to one or more other computing devices, such as devices associated with friends and other contacts of the user. In some embodiments, the computing device may send the original spherical video data to the other computing devices and metadata for changing the positions of the viewport into the spherical video data (e.g., frame to centroid mapping; coordinates; rotation, translation, and/or transformation information, etc.). This can enable the other computing devices to display the original spherical video data as well as the edited video.

Figure 7:
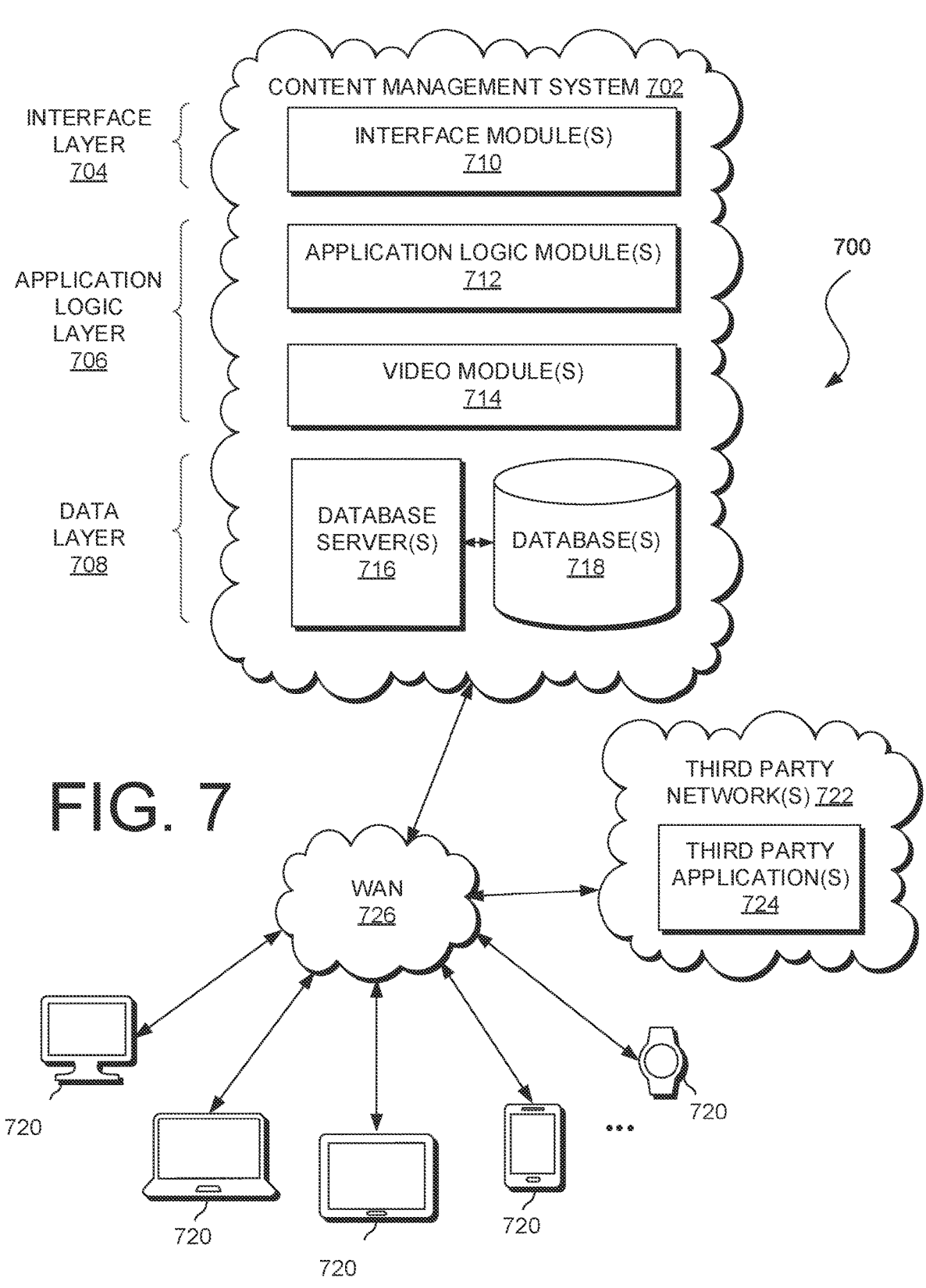
FIG. 7 illustrates an example of a network environment in accordance with an embodiment.

FIG. 7 shows an example of a system, network environment 700, in which various embodiments of the present disclosure may be deployed. For any system or system element discussed herein, there can be additional, fewer, or alternative components arranged in similar or alternative orders, or in parallel, within the scope of the various embodiments unless otherwise stated. Although network environment 700 is a client-server architecture, other embodiments may utilize other network architectures, such as peer-to-peer or distributed network environments.

In this example, network environment 700 includes content management system 702. Content management system 702 may be based on a three-tiered architecture that includes interface layer 704, application logic layer 706, and data layer 708. Each module or component of network environment 700 may represent a set of executable software instructions and the corresponding hardware (e.g., memory and processor) for executing the instructions. To avoid obscuring the subject matter of the present disclosure with unnecessary detail, various functional modules and components that may not be germane to conveying an understanding of the subject matter have been omitted. Of course, additional functional modules and components may be used with content management system 702 to facilitate additional functionality that is not specifically described herein. Further, the various functional modules and components shown in network environment 700 may reside on a single server, or may be distributed across several servers in various arrangements. Moreover, although content management system 702 has a three-tiered architecture, the subject matter of the present disclosure is by no means limited to such an architecture.

Interface layer 704 includes interface modules 710 (e.g., a web interface, a mobile application (app) interface, a restful state transfer (REST) application programming interface (API) or other API, etc.), which can receive requests from various client computing devices and servers, such as client devices 720 executing client applications (not shown) and third-party servers 722 executing third-party applications 724. In response to the received requests, interface modules 710 communicate appropriate responses to requesting devices via wide area network (WAN) 726 (e.g., the Internet). For example, interface modules 710 can receive requests such as HTTP requests, or other Application Programming Interface (API) requests.

Client devices 720 can execute web browsers or apps that have been developed for a specific platform to include any of a wide variety of mobile computing devices and mobile-specific operating systems (e.g., the iOS platform from APPLE® Inc., the ANDROID™ platform from GOOGLE®, Inc., the WINDOWS PHONE® platform from MICROSOFT® Inc., etc.). Client devices 720 can provide functionality to present information to a user and communicate via WAN 726 to exchange information with content management system 702.

In some embodiments, client devices 720 may include a client application such as SNAPCHAT® that, consistent with some embodiments, allows users to exchange ephemeral messages that include media content, including video messages or text messages. In this example, the client application can incorporate aspects of embodiments described herein. The ephemeral messages may be deleted following a deletion trigger event such as a viewing time or viewing completion. In such embodiments, the device may use the various components described herein within the context of any of generating, sending, receiving, or displaying aspects of an ephemeral message.

Client devices 720 can each comprise at least a display and communication capabilities with WAN 726 to access content management system 702. Client devices 720 may include remote devices, workstations, computers, general purpose computers, Internet appliances, hand-held devices, wireless devices, portable devices, wearable computers, cellular or mobile phones, personal digital assistants (PDAs), smartphones, tablets, ultrabooks, netbooks, laptops, desktops, multi-processor systems, microprocessor-based or programmable consumer electronics, game consoles, set-top boxes, network PCs, mini-computers, and the like.

Data layer 708 includes database servers 716 that can facilitate access to information storage repositories or databases 718. Databases 718 may be storage devices that store data such as member profile data, social graph data (e.g., relationships between members of content management system 702), and other user data and content data, such as spherical video data at varying resolutions, and the like.

Application logic layer 706 includes video modules 714, for supporting various video features discussed herein, and application logic modules 712, which, in conjunction with interface modules 710, can generate various user interfaces with data retrieved from various data sources or data services in data layer 708. Individual application logic modules 712 may be used to implement the functionality associated with various applications, services, and features of content management system 702. For instance, a client application can be implemented using one or more application logic modules 712. The client application can provide a messaging mechanism for users of client devices 720 to send and receive messages that include text and media content such as pictures and video. Client devices 720 may access and view the messages from the client application for a specified period of time (e.g., limited or unlimited). In an embodiment, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 712.

Figure 8:
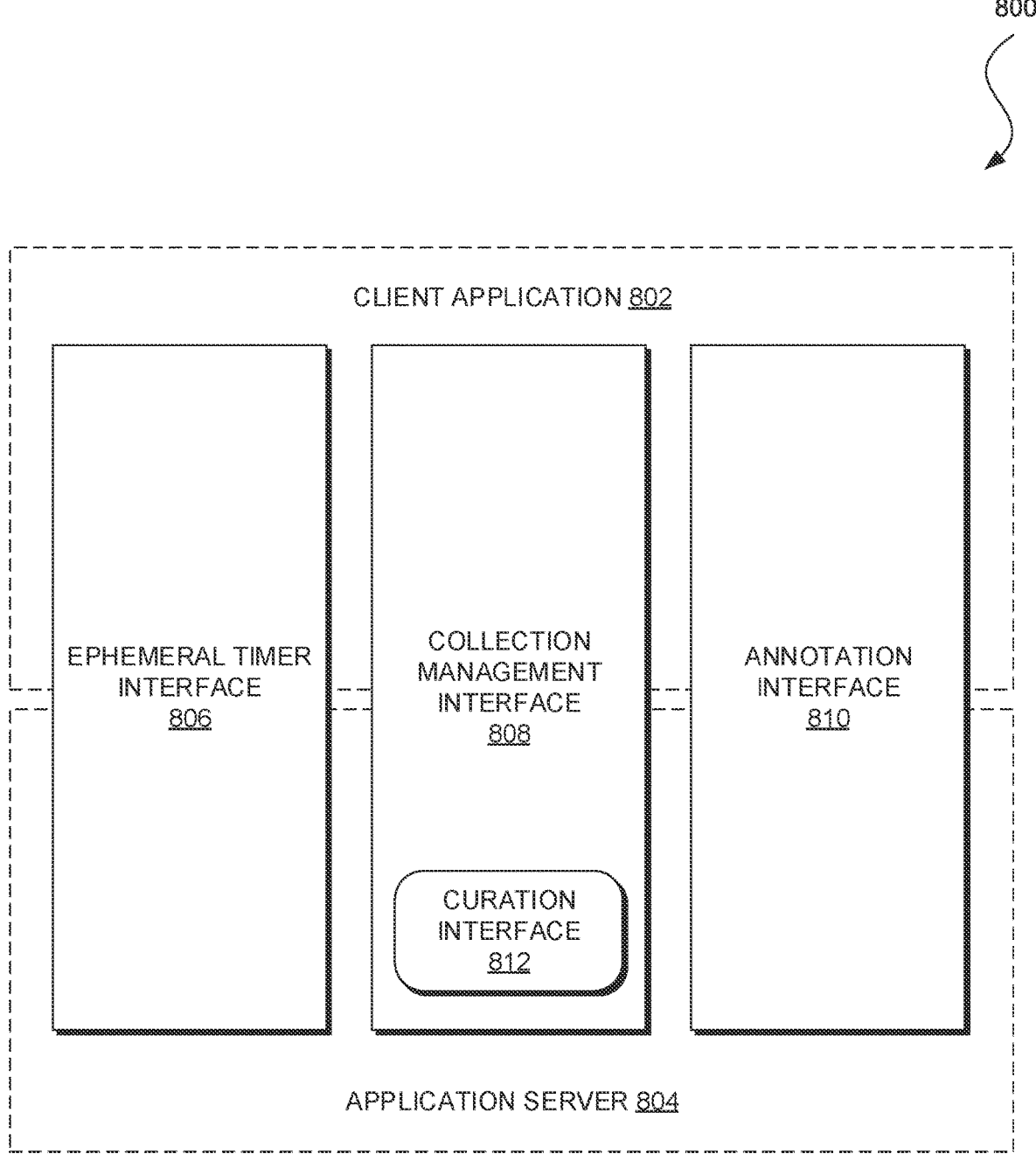
FIG. 8 illustrates an example of a content management system in accordance with an embodiment.

FIG. 8 shows an example of content management system 800 including client application 802 (e.g., running on client devices 820 of FIG. 8) and application server 804 (e.g., an implementation of application logic layer 806). In this example, the operation of content management system 800 encompasses various interactions between client application 802 and application server 804 over ephemeral timer interface 806, collection management interface 808, and annotation interface 810.

Ephemeral timer interface 806 can be a subsystem of content management system 800 responsible for enforcing the temporary access to content permitted by client application 802 and server application 804. To this end, ephemeral timer interface 1014 can incorporate a number of timers that, based on duration and display parameters associated with content, or a collection of content (e.g., messages, videos, a SNAPCHAT® story, etc.), selectively display and enable access to the content via client application 802. Further details regarding the operation of ephemeral timer interface 806 are provided below.

Collection management interface 808 can be a subsystem of content management system 800 responsible for managing collections of media (e.g., collections of text, images, video, audio, applications, etc.). In some embodiments, a collection of content (e.g., messages, including text, images, video, audio, application, etc.) may be organized into an "event gallery" or an "event story." Such a collection may be made available for a specified time period, such as the duration of an event to which the content relates. For example, content relating to a music concert may be made available as a "story" for the duration of that music concert. Collection management interface 808 may also be responsible for publishing a notification of the existence of a particular collection to the user interface of client application 802.

In this example, collection management interface 808 includes curation interface 812 to allow a collection manager to manage and curate a particular collection of content. For instance, curation interface 812 can enable an event organizer to curate a collection of content relating to a specific event (e.g., delete inappropriate content or redundant messages). Additionally, collection management interface 808 can employ machine vision (or image recognition technology) and content rules to automatically curate a content collection. In certain embodiments, compensation may be paid to a user for inclusion of user generated content into a collection. In such cases, curation interface 812 can automatically make payments to such users for the use of their content.

Annotation interface 810 can be a subsystem of content management system 800 that provides various functions to enable a user to annotate or otherwise modify or edit content. For example, annotation interface 810 may provide functions related to the generation and publishing of media overlays for messages or other content processed by content management system 800. Annotation interface 810 can supply a media overlay (e.g., a SNAPCHAT® filter) to client application 802 based on a geolocation of a client device. As another example, annotation interface 810 may supply a media overlay to client application 802 based on other information, such as, social network information of the user of the client device. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device. For example, the media overlay including text that can be overlaid on top of a photograph generated taken by the client device. In yet another example, the media overlay may include an identification of a location overlay (e.g., Venice beach), a name of a live event, or a name of a merchant overlay (e.g., Beach Coffee House). In terface 810 can use the geolocation of the client device to identify a media overlay that includes the name of a merchant at the geolocation of the client device. The media overlay may include other indicia associated with the merchant. The media overlays may be stored in a database (e.g., database 718 of FIG. 7) and accessed through a database server (e.g., database server 716).

In an embodiment, annotation interface 810 can provide a user-based publication platform that enables users to select a geolocation on a map, and upload content associated with the selected geolocation. The user may also specify circumstances under which a particular media overlay should be offered to other users. Annotation interface 810 can generate a media overlay that includes the uploaded content and associates the uploaded content with the selected geolocation.

Figure 9:
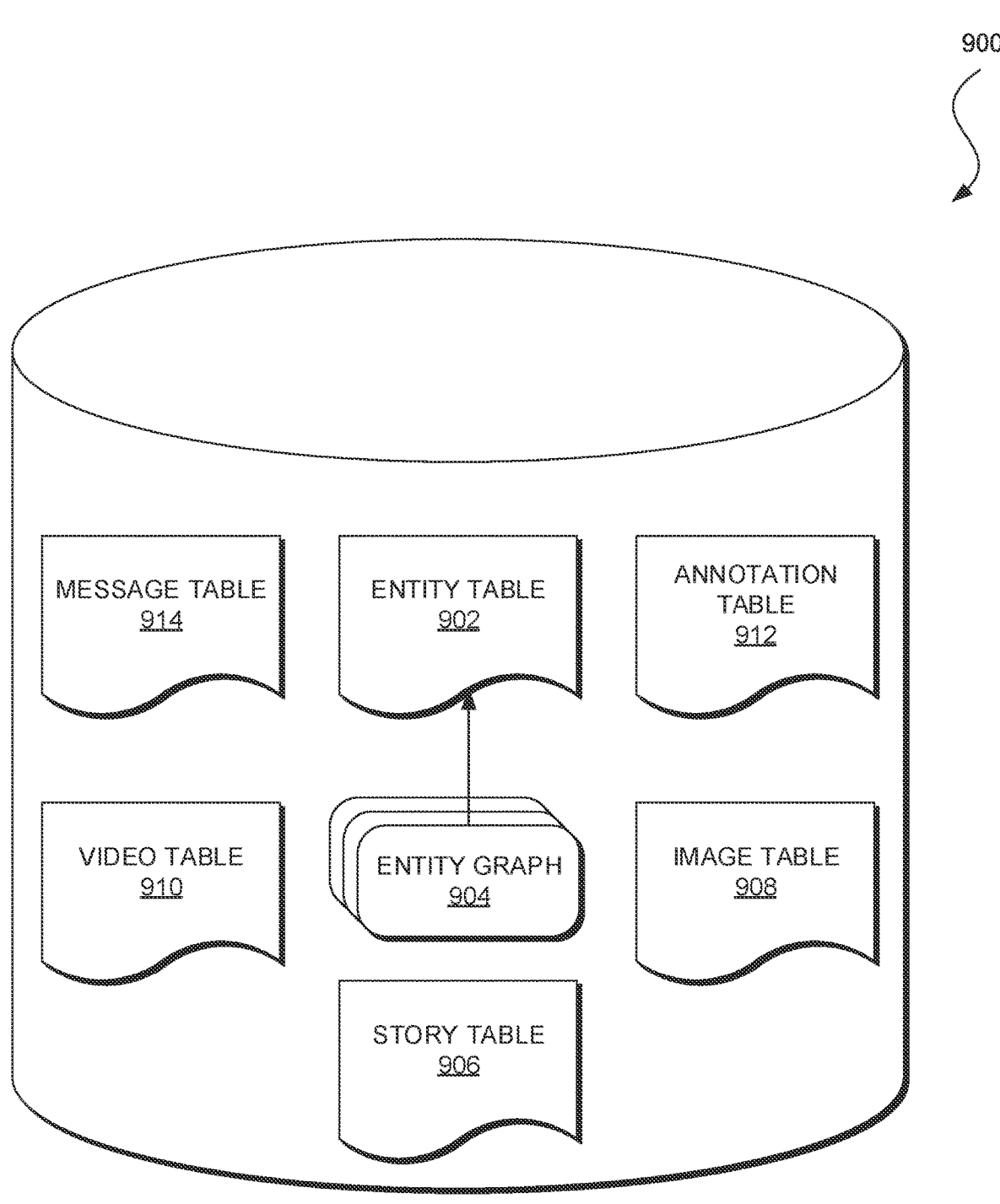
FIG. 9 illustrates an example of a data model for a content management system in accordance with an embodiment.

In another embodiment, annotation interface 810 may provide a merchant-based publication platform that enables merchants to select a particular media overlay associated with a geolocation via a bidding process. For example, annotation interface 810 can associate the media overlay of a highest bidding merchant with a corresponding geolocation for a predefined amount of time FIG. 9 shows an example of data model 900 for a content management system, such as content management system 900. While the content of data model 900 is shown to comprise a number of tables, it will be appreciated that the data could be stored in other types of data structures, such as an object database, a non-relational or "not only" SQL (NoSQL) database, a highly distributed file system (e.g., HADOOP® distributed filed system (HDFS)), etc.

Data model 900 includes message data stored within message table 914. Entity table 902 stores entity data, including entity graphs 904. Entities for which records are maintained within entity table 902 may include individuals, corporate entities, organizations, objects, places, events, etc. Regardless of type, any entity regarding which the content management system 900 stores data may be a recognized entity. Each entity is provided with a unique identifier, as well as an entity type identifier (not shown).

Entity graphs 904 store information regarding relationships and associations between entities. Such relationships may be social, professional (e.g., work at a common corporation or organization), interested-based, activity-based, or based on other characteristics.

Data model 900 also stores annotation data, in the example form of filters, in annotation table 912. Filters for which data is stored within annotation table 912 are associated with and applied to videos (for which data is stored in video table 910) and/or images (for which data is stored in image table 908). Filters, in one example, are overlays that are displayed as overlaid on an image or video during presentation to a recipient user. Filters may be of various types, including user-selected filters from a gallery of filters presented to a sending user by client application 902 when the sending user is composing a message. Other types of filters include geolocation filters (also known as geo-filters) which may be presented to a sending user based on geographic location. For example, geolocation filters specific to a neighborhood or special location may be presented within a user interface by client application 802 of FIG. 8, based on geolocation information determined by a GPS unit of the client device. Another type of filter is a data filter, which may be selectively presented to a sending user by client application 802, based on other inputs or information gathered by the client device during the message creation process. Example of data filters include current temperature at a specific location, a current speed at which a sending user is traveling, battery life for a client device, the current time, or other data captured or received by the client device.

Other annotation data that may be stored within image table 908 can include "lens" data. A "lens" may be a real-time special effect and sound that may be added to an image or a video.

As discussed above, video table 910 stores video data which, in one embodiment, is associated with messages for which records are maintained within message table 914. Similarly, image table 908 stores image data associated with messages for which message data is stored in entity table 902. Entity table 902 may associate various annotations from annotation table 912 with various images and videos stored in image table 908 and video table 910.

Story table 906 stores data regarding collections of messages and associated image, video, or audio data, which are compiled into a collection (e.g., a SNAPCHAT® story or a gallery). The creation of a particular collection may be initiated by a particular user (e.g., each user for which a record is maintained in entity table 902) A user may create a "personal story" in the form of a collection of content that has been created and sent/broadcast by that user. To this end, the user interface of client application 902 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. In some embodiments, users whose client devices have location services enabled and are at a common location event at a particular time may be presented with an option, via a user interface of client application 802, to contribute content to a particular live story. The live story may be identified to the user by client application 802 based on his location. The end result is a "live story" told from a community perspective.

A further type of content collection is known as a "location story", which enables a user whose client device is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 10:
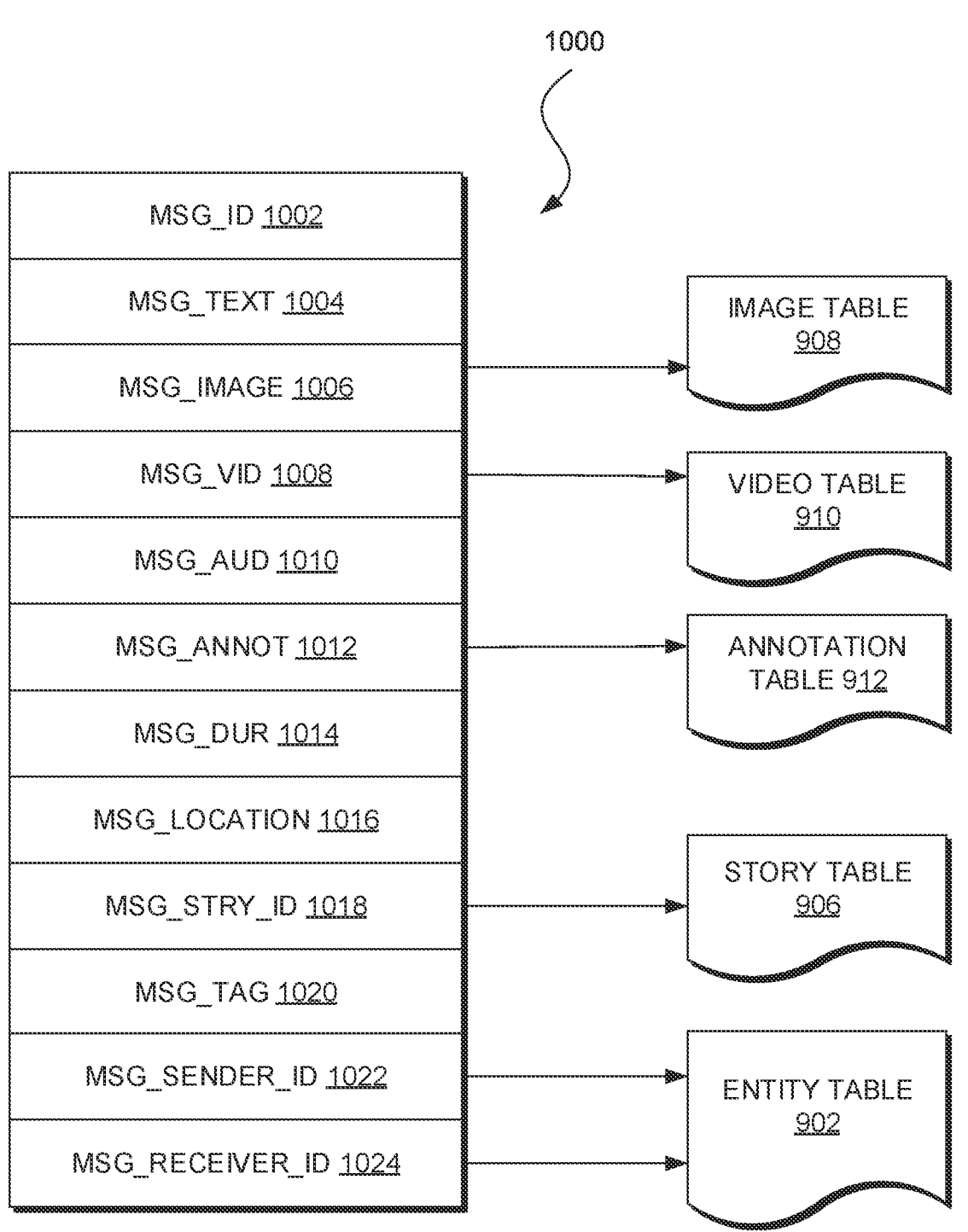
FIG. 10 illustrates an example of a data structure for a message in accordance with an embodiment.

FIG. 10 shows an example of a data structure of a message 1000 that a first client application (e.g., client application 802 of FIG. 8) may generate for communication to a second client application or a server application (e.g., content management system 702). The content of message 1000 can be used to populate message table 914 stored within data model 900 of FIG. 9 and may be accessible by client application 802. Similarly, the content of message 1000 can be stored in memory as "in-transit" or "in-flight" data of the client device or application server. Message 1000 is shown to include the following components:

Message identifier 1002: a unique identifier that identifies message 1000;

Message text payload 1004: text, to be generated by a user via a user interface of a client device and that is included in message 1000;

Message image payload 1006: image data, captured by a camera component of a client device or retrieved from memory of a client device, and that is included in message 1000;

Message video payload 1008: video data, captured by a camera component or retrieved from a memory component of a client device and that is included in message 1000;

Message audio payload 1010: audio data, captured by a microphone or retrieved from the memory component of a client device, and that is included in message 1000;

Message annotations 1012: annotation data (e.g., filters, stickers, or other enhancements) that represents annotations to be applied to message image payload 1006, message video payload 1008, or message audio payload 1010 of message 1000;

Message duration 1014: a parameter indicating, in seconds, the amount of time for which content of the message (e.g., message image payload 1006, message video payload 1008, message audio payload 1010) is to be presented or made accessible to a user via client application 1002;

Message geolocation 1016: geolocation data (e.g., latitudinal and longitudinal coordinates) associated with the content payload of the message. Multiple message geolocation parameter values may be included in the payload, each of these parameter values being associated with respect to content items included in the content (e.g., a specific image into within message image payload 1006, or a specific video in message video payload 1008);

Message story identifier 1018: identifier values identifying one or more content collections (e.g., "stories") with which a particular content item in message image payload 1006 of message 1000 is associated. For example, multiple images within message image payload 1006 may each be associated with multiple content collections using identifier values;

Message tag 1020: each message 1000 may be tagged with multiple tags, each of which is indicative of the subject matter of content included in the message payload. For example, where a particular image included in message image payload 1006 depicts an animal (e.g., a lion), a tag value may be included within message tag 1020 that is indicative of the relevant animal. Tag values may be generated manually, based on user input, or may be automatically generated using, for example, image recognition;

Message sender identifier 1022: an identifier (e.g., a messaging system identifier, email address or device identifier) indicative of a user of a client device on which message 1000 was generated and from which message 1000 was sent;

Message receiver identifier 1024: an identifier (e.g., a messaging system identifier, email address or device identifier) indicative of a user of a client device to which message 1000 is addressed;

The values or data of the various components of message 1000 may be pointers to locations in tables within which the values or data are stored. For example, an image value in message image payload 1006 may be a pointer to (or address of) a location within image table 908. Similarly, values within message video payload 1008 may point to data stored within video table 910, values stored within message annotations 912 may point to data stored in annotation table 912, values stored within message story identifier 1018 may point to data stored in story table 906, and values stored within message sender identifier 1022 and message receiver identifier 1024 may point to user records stored within entity table 902.

Figure 11:
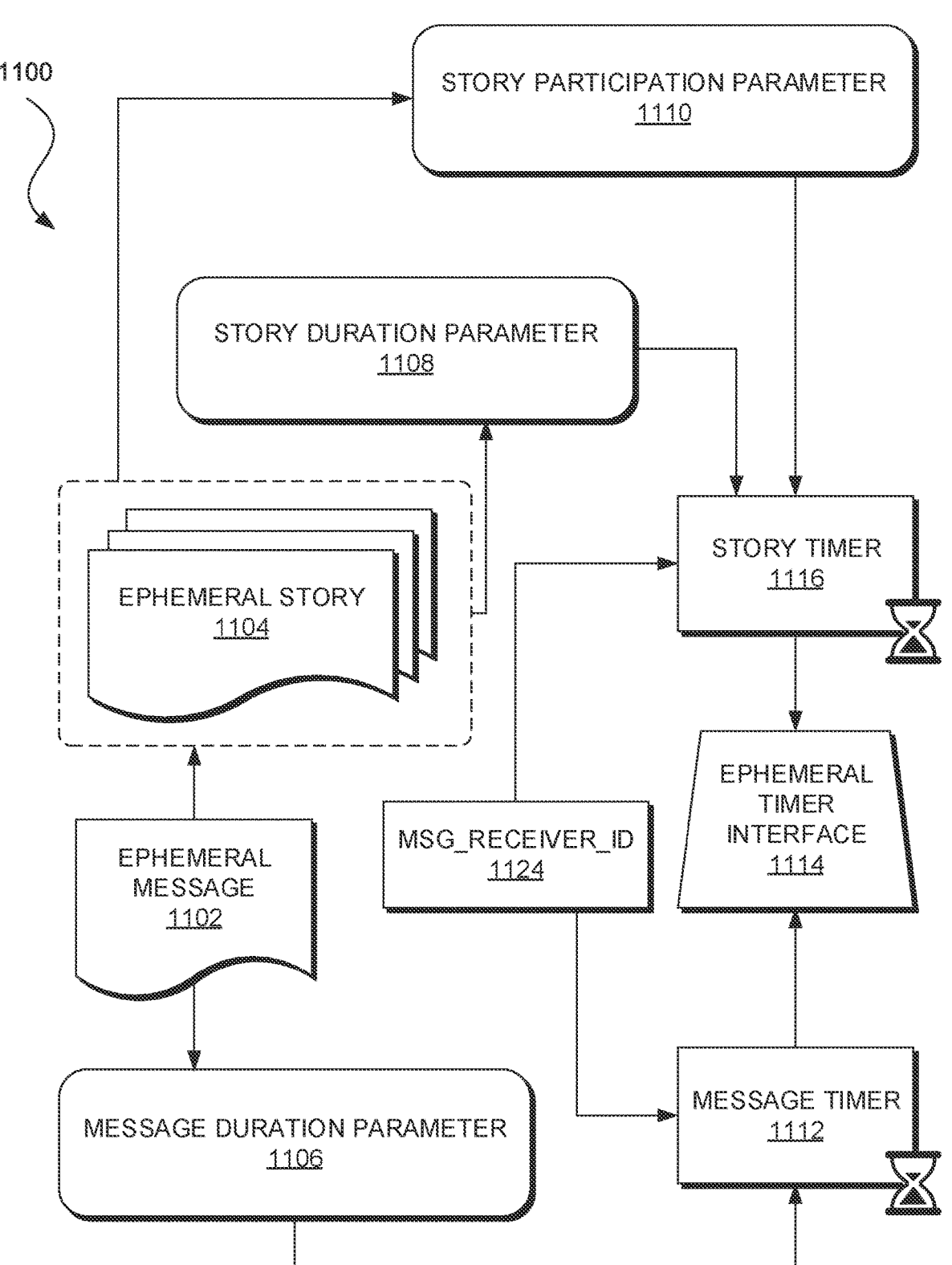
FIG. 11 illustrates an example of a data flow for time-limited content in accordance with an embodiment.

FIG. 11 shows an example of data flow 1100 in which access to content (e.g., ephemeral message 1102, and associated payload of data) and/or a content collection (e.g., ephemeral story 1104) may be time-limited (e.g., made ephemeral) by a content management system (e.g., content management system 702 of FIG. 7).

In this example, ephemeral message 1102 is shown to be associated with message duration parameter 1106, the value of which determines an amount of time that ephemeral message 1102 will be displayed to a receiving user of ephemeral message 1102 by a client application (e.g., client application 802 of FIG. 8). In one embodiment, where client application 802 is a SNAPCHAT® application client, ephemeral message 1102 may be viewable by a receiving user for up to a maximum of 10 seconds that may be customizable by the sending user for a shorter duration.

Message duration parameter 1106 and message receiver identifier 1124 may be inputs to message timer 1112, which can be responsible for determining the amount of time that ephemeral message 1102 is shown to a particular receiving user identified by message receiver identifier 1124. For example, ephemeral message 1102 may only be shown to the relevant receiving user for a time period determined by the value of message duration parameter 1106. Message timer 1112 can provide output to ephemeral timer interface 1114 (e.g., an example of an implementation of ephemeral timer interface 1106), which can be responsible for the overall timing of the display of content (e.g., ephemeral message 1102) to a receiving user.

Ephemeral message 1102 is shown in FIG. 11 to be included within ephemeral story 1104 (e.g., a personal SNAPCHAT® story, an event story, a content gallery, or other content collection). Ephemeral story 1104 maybe associated with story duration 1108, a value of which can establish a time-duration for which ephemeral story 1104 is presented and accessible to users of content management system 702. In an embodiment, story duration parameter 1108, may be the duration of a music concert, and ephemeral story 1104 may be a collection of content pertaining to that concert. Alternatively, a user (either the owning user or a curator) may specify the value for story duration parameter 1108 when performing the setup and creation of ephemeral story 1104.

In some embodiments, each ephemeral message 1102 within ephemeral story 1104 may be associated with story participation parameter 1110, a value of which can set forth the duration of time for which ephemeral message 1102 will be accessible within the context of ephemeral story 1104. For example, a particular ephemeral story may "expire" and become inaccessible within the context of ephemeral story 1104, prior to ephemeral story 1104 itself expiring in terms of story duration parameter 1108. Story duration parameter 1108, story participation parameter 1110, and message receiver identifier 1124 can each provide input to story timer 1116, which can control whether a particular ephemeral message of ephemeral story 1104 will be displayed to a particular receiving user and, if so, for how long. In some embodiments, ephemeral story 1104 may also be associated with the identity of a receiving user via message receiver identifier 1124.

In some embodiments, story timer 1116 can control the overall lifespan of ephemeral story 1104, as well as ephemeral message 1102 included in ephemeral story 1104. In an embodiment, each ephemeral message 1102 within ephemeral story 1104 may remain viewable and accessible for a time-period specified by story duration parameter 1108. In another embodiment, ephemeral message 1102 may expire, within the context of ephemeral story 1104, based on story participation parameter 1110. In some embodiments, message duration parameter 1106 can still determine the duration of time for which a particular ephemeral message is displayed to a receiving user, even within the context of ephemeral story 1104. For example, message duration parameter 1106 can set forth the duration of time that a particular ephemeral message is displayed to a receiving user, regardless of whether the receiving user is viewing that ephemeral message inside or outside the context of ephemeral story 1104.

Ephemeral timer interface 1114 may remove ephemeral message 1102 from ephemeral story 1104 based on a determination that ephemeral message 1102 has exceeded story participation parameter 1110. For example, when a sending user has established a story participation parameter of 24 hours from posting, ephemeral timer interface 1114 will remove the ephemeral message 1102 from ephemeral story 1104 after the specified 24 hours. Ephemeral timer interface 1114 can also remove ephemeral story 1104 either when story participation parameter 1110 for each ephemeral message 1102 within ephemeral story 1104 has expired, or when ephemeral story 1104 itself has expired in terms of story duration parameter 1108.

In an embodiment, a creator of ephemeral message story 1104 may specify an indefinite story duration parameter. In this case, the expiration of story participation parameter 1110 for the last remaining ephemeral message within ephemeral story 1104 will establish when ephemeral story 1104 itself expires. In an embodiment, a new ephemeral message may be added to the ephemeral story 1104, with a new story participation parameter to effectively extend the life of ephemeral story 1104 to equal the value of story participation parameter 1110.

In some embodiments, responsive to ephemeral timer interface 1114 determining that ephemeral story 1104 has expired (e.g., is no longer accessible), ephemeral timer interface 1114 can communicate with content management system 702 of FIG. 7 (and, for example, specifically client application 802 of FIG. 8 to cause an indicium (e.g., an icon) associated with the relevant ephemeral message story to no longer be displayed within a user interface of client application 802). Similarly, when ephemeral timer interface 1114 determines that message duration parameter 1106 for ephemeral message 1102 has expired, ephemeral timer interface 1114 may cause client application 802 to no longer display an indicium (e.g., an icon or textual identification) associated with ephemeral message 1102.

Figure 12:
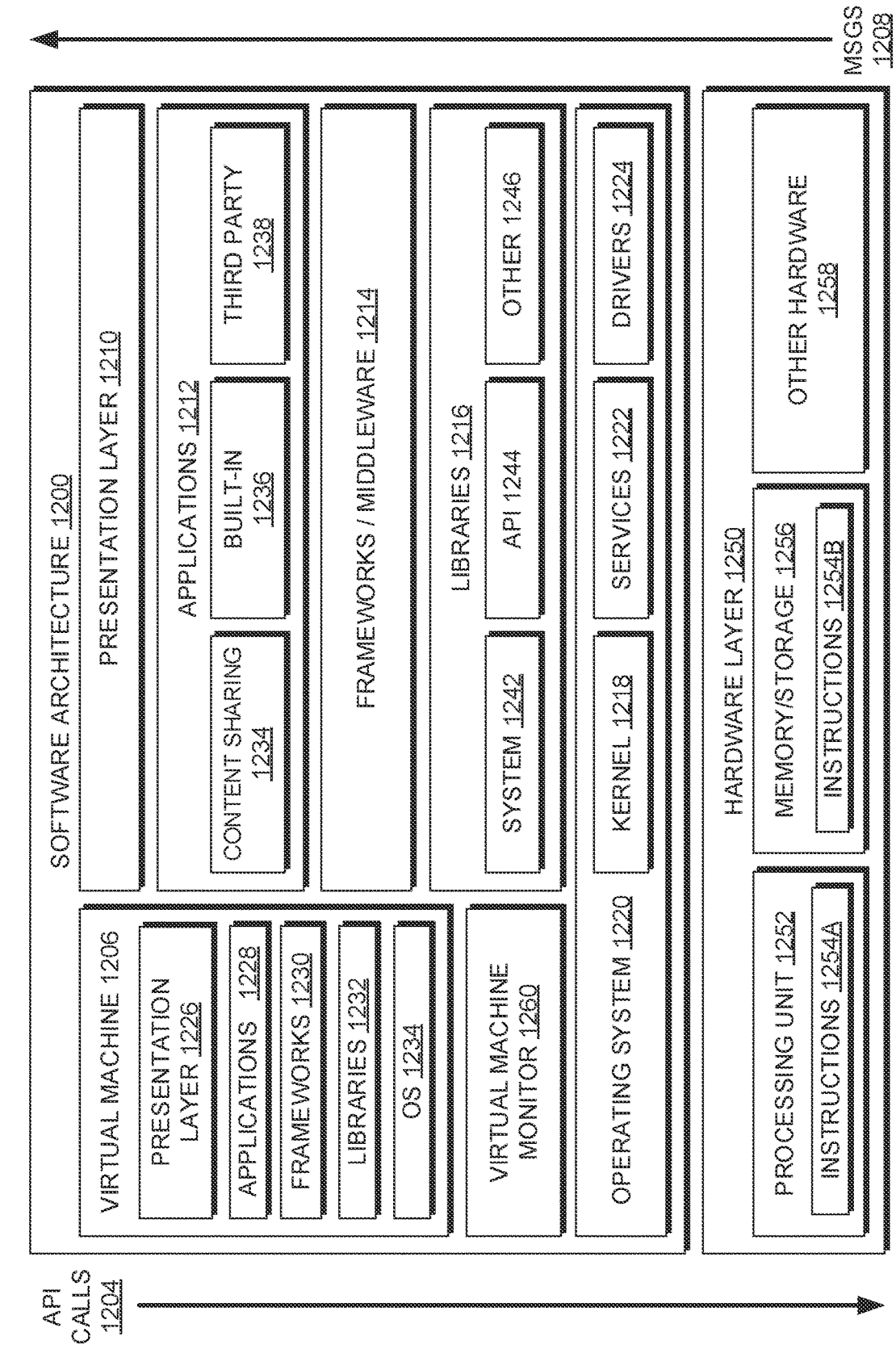
FIG. 12 illustrates an example of a software architecture in accordance with an embodiment.

FIG. 12 shows an example of software architecture 1200, which may be used in conjunction with various hardware architectures described herein. FIG. 12 is merely one example of a software architecture for implementing various embodiments of the present disclosure and other embodiments may utilize other architectures to provide the functionality described herein. Software architecture 1200 may execute on hardware such as computing system 1300 of FIG. 13, that includes processors 1304, memory/storage 1306, and I/O components 1318. Hardware layer 1250 can represent a computing system, such as computing system 1300 of FIG. 13. Hardware layer 1250 can include one or more processing units 1252 having associated executable instructions 1254A. Executable instructions 1254A can represent the executable instructions of software architecture 1200, including implementation of the methods, modules, and so forth of FIGS. 1, 2A and 2B, 3A-3D, 4A-4G, 5A-5F, and 6. Hardware layer 1250 can also include memory and/or storage modules 1256, which also have executable instructions 1254B. Hardware layer 1250 may also include other hardware 1258, which can represent any other hardware, such as the other hardware illustrated as part of computing system 1300.

In the example of FIG. 12, software architecture 1200 may be conceptualized as a stack of layers in which each layer provides particular functionality. For example, software architecture 1200 may include layers such as operating system 1220, libraries 1216, frameworks/middleware 1214, applications 1212, and presentation layer 1210. Operationally, applications 1212 and/or other components within the layers may invoke API calls 1204 through the software stack and receive a response, returned values, and so forth as messages 1208. The layers illustrated are representative in nature and not all software architectures have all layers. For example, some mobile or special-purpose operating systems may not provide a frameworks/middleware layer 1214, while others may provide such a layer. Other software architectures may include additional or different layers.

Operating system 1220 may manage hardware resources and provide common services. In this example, operating system 1220 includes kernel 1218, services 1222, and drivers 1224. Kernel 1218 may operate as an abstraction layer between the hardware and the other software layers. For example, kernel 1218 may be responsible for memory management, processor management (e.g., scheduling), component management, networking, security settings, and so on. Services 1222 may provide other common services for the other software layers. Drivers 1224 may be responsible for controlling or interfacing with the underlying hardware. For instance, drivers 1224 may include display drivers, camera drivers, Bluetooth drivers, flash memory drivers, serial communication drivers (e.g., Universal Serial Bus (USB) drivers), Wi-Fi drivers, audio drivers, power management drivers, and so forth depending on the hardware configuration.

Libraries 1216 may provide a common infrastructure that may be utilized by applications 1212 and/or other components and/or layers. Libraries 1216 typically provide functionality that allows other software modules to perform tasks in an easier fashion than to interface directly with the underlying operating system functionality (e.g., kernel 1218, services 1222, and/or drivers 1224). Libraries 1216 may include system libraries 1242 (e.g., C standard library) that may provide functions such as memory allocation functions, string manipulation functions, mathematic functions, and the like. In addition, libraries 1216 may include API libraries 1244 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphics for display), database libraries (e.g., SQLite that may provide various relational database functions), web libraries (e.g., WebKit that may provide web browsing functionality), and the like. Libraries 1216 may also include a wide variety of other libraries 1246 to provide many other APIs to applications 1212 and other software components/modules.

Frameworks 1214 (sometimes also referred to as middleware) may provide a higher-level common infrastructure that may be utilized by applications 1212 and/or other software components/modules. For example, frameworks 1214 may provide various graphic user interface (GUI) functions, high-level resource management, high-level location services, and so forth. Frameworks 1214 may provide a broad spectrum of other APIs that may be utilized by applications 1212 and/or other software components/modules, some of which may be specific to a particular operating system or platform.

Applications 1212 include content sharing network client application 1234, built-in applications 1236, and/or third-party applications 1238. Examples of representative built-in applications 1236 include a contacts application, a browser application, a book reader application, a location application, a media application, a messaging application, and/or a game application. Third-party applications 1238 may include any built-in applications 1236 as well as a broad assortment of other applications. In an embodiment, third-party application 1238 (e.g., an application developed using the ANDROID™ or IOS® software development kit (SDK) by an entity other than the vendor of the particular platform) may be mobile software running on a mobile operating system such as IOS®, ANDROID™, WINDOWS PHONE®, or other mobile operating systems. In this example, third-party application 1238 may invoke API calls 1204 provided by operating system 1220 to facilitate functionality described herein.

Applications 1212 may utilize built-in operating system functions (e.g., kernel 1218, services 1222, and/or drivers 1224), libraries (e.g., system libraries 1242, API libraries 1244, and other libraries 1246), or frameworks/middleware 1214 to create user interfaces to interact with users of the system. Alternatively, or in addition, interactions with a user may occur through presentation layer 1210. In these systems, the application/module "logic" can be separated from the aspects of the application/module that interact with a user.

Some software architectures utilize virtual machines. In the example of FIG. 12, this is illustrated by virtual machine 1206. A virtual machine creates a software environment where applications/modules can execute as if they were executing on a physical computing device (e.g., computing system 1300 of FIG. 13). Virtual machine 1206 can be hosted by a host operating system (e.g., operating system 1220). The host operating system typically has a virtual machine monitor 1260, which may manage the operation of virtual machine 1206 as well as the interface with the host operating system (e.g., operating system 1220). A software architecture executes within virtual machine 1206, and may include operating system 1234, libraries 1232, frameworks/middleware 1230, applications 1228, and/or presentation layer 1226. These layers executing within virtual machine 1206 can operate similarly or differently to corresponding layers previously described.

Figure 13:
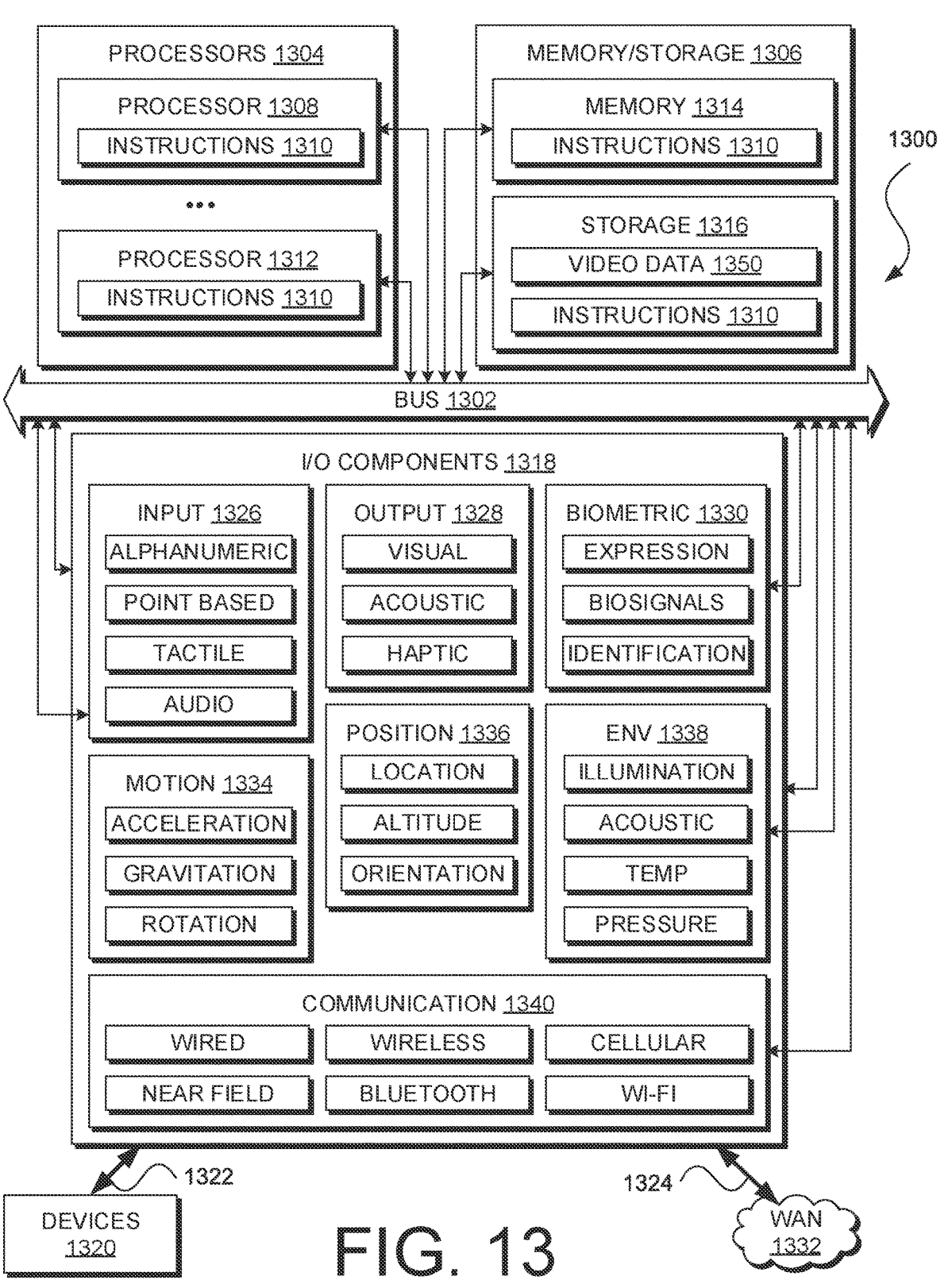
FIG. 13 illustrates an example of a computing system in accordance with an embodiment.

FIG. 13 shows an example of a computing device, computing system 1300, in which various embodiments of the present disclosure may be implemented. In this example, computing system 1300 can read instructions 1310 from a computer-readable medium (e.g., a computer-readable storage medium) and perform any one or more of the methodologies discussed herein. Instructions 1310 may include software, a program, an application, an applet, an app, or other executable code for causing computing system 1300 to perform any one or more of the methodologies discussed herein. For example, instructions 1310 may cause computing system 1300 to execute process 600 of FIG. 6. In addition or alternatively, instructions 1310 may implement work flow 100 of FIG. 1, graphical user interfaces 200 and 250 of FIGS. 2A and 2B, the approach for determining movement data of FIGS. 3A-3D; the approach for editing spherical video data of FIGS. 4A-4G; the approach for representing video edited from spherical video data of FIGS. 5A-5F; application logic modules 712 or video modules 714 of FIG. 7; client application 1234 of FIG. 12, and so forth. Instructions 1310 can transform a general, non-programmed computer, such as computing system 1300 into a particular computer programmed to carry out the functions described herein.

In some embodiments, computing system 1300 can operate as a standalone device or may be coupled (e.g., networked) to other devices. In a networked deployment, computing system 1300 may operate in the capacity of a server or a client device in a server-client network environment, or as a peer device in a peer-to-peer (or distributed) network environment. Computing system 1300 may include a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any electronic device capable of executing instructions 1310, sequentially or otherwise, that specify actions to be taken by computing system 1300. Further, while a single device is illustrated in this example, the term "device" shall also be taken to include a collection of devices that individually or jointly execute instructions 1310 to perform any one or more of the methodologies discussed herein.

Computing system 1300 may include processors 1304, memory/storage 1306, and I/O components 1318, which may be configured to communicate with each other such as via bus 1302. In some embodiments, processors 1304 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio frequency integrated circuit (RFIC), another processor, or any suitable combination thereof) may include processor 1308 and processor 1312 for executing some or all of instructions 1310. The term "processor" is intended to include a multi-core processor that may comprise two or more independent processors (sometimes also referred to as "cores") that may execute instructions contemporaneously. Although FIG. 13 shows multiple processors 1304, computing system 1300 may include a single processor with a single core, a single processor with multiple cores (e.g., a multi-core processor), multiple processors with a single core, multiple processors with multiples cores, or any combination thereof.

Memory/storage 1306 may include memory 1314 (e.g., main memory or other memory storage) and storage 1316 (e.g., a hard-disk drive (HDD) or solid-state device (SSD) may be accessible to processors 1304, such as via bus 1302. Storage 1316 and memory 1314 store instructions 1310, which may embody any one or more of the methodologies or functions described herein. Storage 1316 may also store video data 1350, including spherical video data, edited video, and other data discussed in the present disclosure. Instructions 1310 may also reside, completely or partially, within memory 1314, within storage 1316, within processors 1304 (e.g., within the processor's cache memory), or any suitable combination thereof, during execution thereof by computing system 1300. Accordingly, memory 1314, storage 1316, and the memory of processors 1304 are examples of computer-readable media.

As used herein, "computer-readable medium" means an object able to store instructions and data temporarily or permanently and may include random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" may include a single medium or multiple media (e.g., a centralized or distributed database, or associated caches and servers) able to store instructions 1310. The term "computer-readable medium" can also include any medium, or combination of multiple media, that is capable of storing instructions (e.g., instructions 1310) for execution by a computer (e.g., computing system 1300), such that the instructions, when executed by one or more processors of the computer (e.g., processors 1304), cause the computer to perform any one or more of the methodologies described herein. Accordingly, a "computer-readable medium" refers to a single storage apparatus or device, as well as "cloud-based" storage systems or storage networks that include multiple storage apparatus or devices. The term "computer-readable medium" excludes signals per se.

I/O components 1318 may include a wide variety of components to receive input, provide output, produce output, transmit information, exchange information, capture measurements, and so on. The specific I/O components included in a particular device will depend on the type of device. For example, portable devices such as mobile phones will likely include a touchscreen or other such input mechanisms, while a headless server will likely not include a touch sensor. In some embodiments, I/O components 1318 may include output components 1326 and input components 1328. Output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 1318 may include alphanumeric input components (e.g., a keyboard, a touch screen configured to receive alphanumeric input, a photo-optical keyboard, or other alphanumeric input components), pointer-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In some embodiments, I/O components 1318 may also include biometric components 1330, motion components 1334, position components 1336, or environmental components 1338, or among a wide array of other components. For example, biometric components 1330 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. Motion components 1334 may include acceleration sensor components (e.g., accelerometer), gravitation sensor components, rotation sensor components (e.g., gyroscope), and so forth. Position components 1336 may include location sensor components (e.g., a Global Position System (GPS) receiver component), altitude sensor components (e.g., altimeters or barometers that detect air pressure from which altitude may be derived), orientation sensor components (e.g., magnetometers), and the like. Environmental components 1338 may include illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment.

Communication may be implemented using a wide variety of technologies. I/O components 1318 may include communication components 1340 operable to couple computing system 1300 to WAN 1332 or devices 1320 via coupling 1324 and coupling 1322 respectively. For example, communication components 1340 may include a network interface component or other suitable device to interface with WAN 1332. In some embodiments, communication components 1340 may include wired communication components, wireless communication components, cellular communication components, Near Field Communication (NFC) components, Bluetooth components (e.g., Bluetooth Low Energy), Wi-Fi components, and other communication components to provide communication via other modalities. Devices 1320 may be another computing device or any of a wide variety of peripheral devices (e.g., a peripheral device coupled via USB).

Moreover, communication components 1340 may detect identifiers or include components operable to detect identifiers. For example, communication components 1340 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via communication components 1340, such as location via Internet Protocol (IP) geolocation, location via Wi-Fi signal triangulation, location via detecting an NFC beacon signal that may indicate a particular location, and so forth.

In various embodiments, one or more portions of WAN 1332 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi network, another type of network, or a combination of two or more such networks. For example, WAN 1332 or a portion of WAN 1332 may include a wireless or cellular network and coupling 1324 may be a Code Division Multiple Access (CDMA) connection, a Global System for Mobile communications (GSM)

connection, or another type of cellular or wireless coupling. In this example, coupling 1324 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

Instructions 1310 may be transmitted or received over WAN 1332 using a transmission medium via a network interface device (e.g., a network interface component included in communication components 1340) and utilizing any one of several well-known transfer protocols (e.g., HTTP). Similarly, instructions 1310 may be transmitted or received using a transmission medium via coupling 1322 (e.g., a peer-to-peer coupling) to devices 1320. The term "transmission medium" includes any intangible medium that is capable of storing, encoding, or carrying instructions 1310 for execution by computing system 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
accessing, by one or more processors, a set of one or more spherical frames;
detecting, by the one or more processors, an editing input that indicates a path of motion and is defined by motions detected during an editing mode initiated by a start edit mode input and terminated by a stop edit mode input;
cropping, by the one or more processors, a corresponding portion of pixels from each spherical frame in the accessed set of one or more spherical frames based on a corresponding position along the path of motion indicated by the detected editing input that is defined by the motions detected during the editing mode initiated by the start edit mode input and terminated by the stop edit mode input; and
generating, by the one or more processors, a video that includes one or more of the corresponding portions of pixels that were cropped from the accessed one or more spherical frames.

2. The method of claim 1, further comprising:
detecting the path of motion based on motion sensor data that indicates device movement along at least a portion of the path of motion; and wherein:
the cropping of the corresponding portion of pixels from each spherical frame includes determining a first portion of a first spherical frame among the set of one or more spherical frames based on the portion of the path of motion along which the device movement is indicated by the motion sensor data.

3. The method of claim 1, further comprising:
detecting the path of motion based on position sensor data that indicates device movement along at least a portion of the path of motion; and wherein:
the cropping of the corresponding portion of pixels from each spherical frame includes determining a first portion of a first spherical frame among the set of one or more spherical frames based on the portion of the path of motion along which the device movement is indicated by the position sensor data.

4. The method of claim 1, further comprising:
detecting the path of motion based on optical sensor data that indicates device movement along at least a portion of the path of motion; and wherein:
the cropping of the corresponding portion of pixels from each spherical frame includes determining a first portion of a first spherical frame among the set of one or more spherical frames based on the portion of the path of motion along which the device movement is indicated by the optical sensor data.

5. The method of claim 1, wherein:
the cropping of the corresponding portion of pixels from each spherical frame is based on the path of motion indicated as the editing input.

6. The method of claim 1, further comprising:
detecting the path of motion during activation of a control element that corresponds to an editing mode of a device, the activation of the control element indicating that the path of motion is an editing input.

7. The method of claim 1, wherein:
the set of one or more spherical frames is included in a spherical video; and the method further comprises:

detecting the path of motion in response to a designation of the path as the editing input to edit the spherical video.

8. The method of claim 1, wherein:

the set of one or more spherical frames is included in a spherical video; and the method further comprises:

detecting the path of motion by tracking movement of an object depicted in the spherical video, the path of motion being defined by the tracked movement of the object depicted in the spherical video.

9. The method of claim 1, further comprising:

detecting the path of motion based on tracked movement of an object detected by a sensor of a device, the path of motion being defined by the tracked movement of the object detected by the sensor of the device.

10. The method of claim 1, further comprising:

detecting the path of motion based on tracked movement of an eye of a user of a device, the eye being detected by a sensor of the device, the path of motion being defined by the tracked movement of the eye of the user.

11. The method of claim 1, further comprising:

detecting the path of motion based on tracked movement of a head a user of a device, the head being detected by a sensor of the device, the path of motion being defined by the tracked movement of the head of the user.

12. A non-transitory machine-readable storage medium comprising instructions that, when executed by one or more processors of a machine, cause the machine to perform operations comprising:

accessing a set of one or more spherical frames;

detecting an editing input that indicates a path of motion and is defined by motions detected during an editing mode initiated by a start edit mode input and terminated by a stop edit mode input;

cropping a corresponding portion of pixels from each spherical frame in the accessed set of one or more spherical frames based on a corresponding position along the path of motion indicated by the detected editing input that is defined by the motions detected during the editing mode initiated by the start edit mode input and terminated by the stop edit mode input; and generating a video that includes one or more of the corresponding portions of pixels that were cropped from the accessed one or more spherical frames.

13. The non-transitory machine-readable storage medium of claim 12, wherein:

the cropping of the corresponding portion of pixels from each spherical frame is based on the path of motion indicated as the editing input.

14. The non-transitory machine-readable storage medium of claim 12, wherein:

detecting the path of motion during activation of a control element that corresponds to an editing mode of a device, the activation of the control element indicating that the path of motion is an editing input.

15. The non-transitory machine-readable storage medium of claim 12, wherein:

the set of one or more spherical frames is included in a spherical video; and the operations further comprise:

detecting the path of motion in response to a designation of the path as the editing input to edit the spherical video.

16. A system comprising:

one or more processors; and a memory storing instructions that, when executed by at least one processor among the one or more processors, cause the system to perform operations comprising:

accessing a set of one or more spherical frames;

detecting an editing input that indicates a path of motion and is defined by motions detected during an editing mode initiated by a start edit mode input and terminated by a stop edit mode input;

cropping a corresponding portion of pixels from each spherical frame in the accessed set of one or more spherical frames based on a corresponding position along the path of motion indicated by the detected editing input that is defined by the motions detected during the editing mode initiated by the start edit mode input and terminated by the stop edit mode input; and generating a video that includes one or more of the corresponding portions of pixels that were cropped from the accessed one or more spherical frames.

17. The system of claim 16, wherein:

the cropping of the corresponding portion of pixels from each spherical frame is based on the path of motion indicated as the editing input.

18. The system of claim 16, wherein:

detecting the path of motion during activation of a control element that corresponds to an editing mode of a device, the activation of the control element indicating that the path of motion is an editing input.

19. The system of claim 16, wherein:

the set of one or more spherical frames is included in a spherical video; and the operations further comprise:

detecting the path of motion in response to a designation of the path as the editing input to edit the spherical video.

20. The system of claim 16, wherein:

the set of one or more spherical frames is included in a spherical video; and the operations further comprise:

detecting the path of motion by tracking movement of an object depicted in the spherical video, the path of motion being defined by the tracked movement of the object depicted in the spherical video.

\* \* \* \* \*